US006949915B2

(12) United States Patent
Stanley

(10) Patent No.: US 6,949,915 B2
(45) Date of Patent: Sep. 27, 2005

(54) OPPOSED CURRENT CONVERTER POWER FACTOR CORRECTING POWER SUPPLY

(75) Inventor: Gerald R. Stanley, Osceola, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 45 days.

(21) Appl. No.: 10/626,433

(22) Filed: Jul. 24, 2003

(65) Prior Publication Data

US 2005/0017695 A1 Jan. 27, 2005

(51) Int. Cl.$^7$ ................................................. G05F 1/70
(52) U.S. Cl. ..................................... 323/207; 363/127
(58) Field of Search ......................... 323/207; 363/127, 363/44

(56) References Cited

U.S. PATENT DOCUMENTS

| | | | |
|---|---|---|---|
| 3,265,930 A | | 8/1966 | Powell |
| 4,190,882 A | | 2/1980 | Chevalier et al. |
| 4,903,181 A | | 2/1990 | Seidel |
| 5,383,109 A | | 1/1995 | Maksimovic et al. |
| 5,657,219 A | | 8/1997 | Stanley |
| 5,923,152 A | * | 7/1999 | Guerrera ..................... 323/222 |
| 6,373,734 B1 | | 4/2002 | Martinelli |
| 6,388,429 B1 | | 5/2002 | Mao |
| 6,465,990 B2 | | 10/2002 | Acatrinei et al. |
| 6,531,854 B2 | | 3/2003 | Hwang |

OTHER PUBLICATIONS

"Switched–mode Power Supply Control Circuit," *Phillips Semiconductors Product Specification*, Aug. 1994.
"Enhanced High Power Factor Preregulator," *Texas Instruments*, Jun. 1998.

Gerald R. Stanley and Kenneth M. Bradshaw, "Precision DC–to–AC Power Conversion by Optimization of the Output Current Waveform—the Half–Bridge Revisited", *IEEE Transactions on Power Electronics*, vol. 14, No. 2, Mar. 1999.
Wally E. Rippel, Optimizing Boost Chopper Charger Design, *Jet Propulsion Laboratory Proceedings of Power Con 6*, May 1979.
"Design of H–Bridge Multilevel Active Rectifier for Traction Systems", IEEE Transactions on Industry Applications, vol. 39, No. 5, Sep./Oct. 2003, Carlo Cecati, Antonio Dell'Aquila, Marco Liserre and Vito Giuseppe Monopoli.
"A Passivity–Based Multilevel Active Rectifier with Adaptive Compensation for Traction Applications", IEEE Transactions on Industry Applications, vol. 39, No. 5, Sep./Oct. 2003, Carlo Cecati, Antonio Dell'Aquila, Marco Liserre and Vito Giuseppe Monopoli.

(Continued)

*Primary Examiner*—Shawn Riley
(74) *Attorney, Agent, or Firm*—Brinks Hofer Gilson & Lione

(57) ABSTRACT

A power factor correcting power supply includes an input stage power converter and an output stage power converter. The input stage power converter includes an opposed current converter and a power factor correction controller. The power factor correction controller may direct the operation of the opposed current converter to perform power factor correction and voltage regulation. The opposed current converter is supplied AC input voltage and AC input current from a power source. The AC input voltage is converted to a DC boost voltage by the opposed current converter. The DC boost voltage may be converted to a desired DC output voltage by the output stage power converter. The desired DC output voltage may be provided on a DC rail for a load of the power factor correcting power supply.

59 Claims, 12 Drawing Sheets

OTHER PUBLICATIONS

"Multilevel Converters for Large Electric Drives", IEEE Transactions on Industry Applications, vol. 35, No. 1, Jan./Feb. 1999, Leon M. Tolbert, Fang Zheng Peng and Thomas G. Habetler.

"Multilevel Converters—A New Breed of Power Converters", IEEE Transactions on Industry Appications, vol. 32, No. 3, May/Jun. 1996, Jih–Sheng Lang and Fang Sheng Peng.

"A New Multilevel PWM Method: A Theoretical Analysis", IEEE Transactions on Industry Applications, vol. 7, No. 3, Jul. 1992, Giuseppe Carrara, Simone Gardella, Mario Marchesoni, Raffaele Salutari and Giuseppe Sciutto.

* cited by examiner

OPPOSED CURRENT CONVERTER POWER FACTOR CORRECTING POWER SUPPLY

BACKGROUND OF THE INVENTION

1. Technical Field

The invention generally relates to power supplies and, more particularly, to a power supply having an opposed current converter that performs power factor correction.

2. Related Art

Power supplies are utilized as a source of power in many electrical devices including most devices having electronic circuits. A power supply may utilize input power from a single phase or multiple phase alternating current source to produce output power. The output power may be produced at one or more predetermined voltages with a determined range of output current. The output power may be alternating current (AC) or direct current (DC) of almost any magnitude depending on the load the power supply is serving.

Some power supplies and associated electrical device loads may be classified as non-linear power electronic loads. Such non-linear power electronic loads typically include rectifier/capacitor input stages that are characterized by an undesirably low power factor due to excessive load current harmonics. Load current harmonics cause an increase in the magnitude of RMS current supplied to such a non-linear power electronic load. Load current harmonics result in a reduction in power factor because they do not provide useful power to the non-linear power electronic load.

Multiple kilowatt non-linear power electronic loads, such as a high power audio amplifier or a magnetic resonance imaging gradient amplifier, place significant current demands on a source of input power. A power feed from a source of input power may be supplied to a load from a circuit breaker with limited current carrying capacity. For example, a power feed from a source of input power that is a single phase power distribution system may be supplied from a circuit breaker that is rated for fifteen amps of sustained RMS current at near unity power factor. When a load with a low power factor is present, the RMS current requirement is higher, and the circuit breaker may open the power feed even though the load is not utilizing substantial power.

Power factor correction (PFC) may be used to decrease the magnitude of additional RMS current resulting from harmonics. Power factor correction may involve working to maintain the current drawn from an AC source in phase and identical in form with the voltage drawn from the AC source. For non-linear power electronic loads, there are passive and active power factor correction approaches. Passive approaches include series inductor filters and resonant filters. Active approaches include boost derived converters and other switch mode based systems.

In general, boost derived converters operate with switching frequencies higher than the frequency of the source of input power (typically 50–60 Hz) to control the shape of the input current waveform. The operating frequency of boost derived converters may result in undesirably high current ripple frequencies. In addition to power factor correction, boost derived converters that are referred to as universal input boost converters have the capability to accept a range of input voltages such as 100VAC nominal (Japan), 120VAC nominal (United States) and 230VAC nominal (Europe). Boost derived converters may also provide voltage regulation of the output voltage of the converter.

Some boost derived converters operate with PFC in a discontinuous conduction mode (DCM). To minimize ripple current associated with such switch mode operation, some boost derived converters operate with an interleaved configuration. The interleaved configuration involves multiple switches that are operated sequentially during a switching period to increase ripple frequency while reducing ripple magnitude. The reduction in ripple magnitude further decreases undesirable line currents and therefore improves power factor.

The reduced magnitude of ripple current, however, still creates undesirable load currents. In addition, significant power losses are experienced within known boost derived converters due to the number of stages the power must be processed through. A boost derived converter may include a first stage that is a bridge rectifier, a second stage that is a DC to DC boost converter and a third stage that is a DC to DC power converter with galvanic isolation. Significantly increased power losses also occur in known boost derived converters during conditions of low supply voltage due to high input currents. Some boost derived converters also must limit the size of boost inductors included in the boost derived converter due to the inability to quickly magnetize and demagnetize the inductors. Limiting the size of the boost inductors may result in increased ripple current, to avoid distorting the input current over time (dI/dt) during periods of low input voltage.

Therefore a need exists for a power factor correcting power supply with lower harmonics, greater power efficiency, and minimization of the ripple current.

SUMMARY

This invention provides a power factor correcting power supply for supplying DC power from an AC power source. The power factor correcting power supply includes an input stage power converter and an output stage power converter. The input stage power converter operates as a boost converter to convert AC input voltage (Vin) to a first DC voltage that is a boost voltage (Vboost). The output stage power converter operates as a DC to DC converter to convert the boost voltage to a second DC voltage that is an isolated DC output voltage. The DC output voltage is provided to DC rails to supply a load, such as an audio amplifier.

The input stage power converter includes at least one opposed current converter and a power factor correction (PFC) controller. The opposed current converter may be controlled by the PFC controller to perform power factor correction and voltage regulation of the DC output voltage. Due to the use of the opposed current converter, a bridge rectifier to rectify the AC input voltage (Vin) is not needed and therefore the accompanying losses are avoided. The opposed current converter is also operated with interleave by the PFC controller to reduce ripple current and improve power factor.

The opposed current converter includes at least one pair of boost switches, at least one pair of boost inductors and at least one boost capacitor. The boost switches are directed to open and close at a selected duty cycle by the PFC controller. The duty cycle of the pair of boost switches may be controlled such that the pair of boost switches are closed concurrently during each duty cycle. The center of a time period when each of the boost switches is closed may be substantially the same. The duty cycle of the boost switches magnetizes and demagnetizes the boost inductors. The boost inductors may be magnetized by the power source and by power stored in the boost capacitor. Demagnetization of the boost inductors provides a peak charging current (Ic) and a pulse width modulation (PWM) voltage (Vc) with a sinusoidal average waveform. The boost capacitor is charged to the boost voltage (Vboost) by the PWM voltage (Vc) and the peak charging current (Ic). The magnitude of the peak-to-peak input voltage (Vin) is increased by a boost ratio to the magnitude of the boost voltage (Vboost).

The sinusoidal average waveform of the PWM voltage (Vc) generated by the opposed current converter may be controlled by the PFC controller via the pair of boost switches to improve the power factor. The amplitude of the average waveform of the PWM voltage (Vc) may be controlled to be substantially similar to the amplitude of the waveform of the AC input voltage (Vin). The AC current waveform may therefore be maintained in about the same waveshape as the AC input voltage (Vin), and the power factor is improved. The duty cycle of the boost switches is further controlled by the PFC controller to compensate for a range of magnitudes of AC input voltage (Vin), such as from about 90VAC to about 265VAC. The un-rectified AC input voltage (Vin) may be used to produce a boost voltage (Vboost), such as about 380VDC to about 400VDC.

The PFC controller may also regulate the DC output voltage of the power factor correcting power supply with the opposed current converter. Voltage regulation may be controlled based on a tracking gain ratio. The tracking gain ratio is a desired ratio of the input voltage (Vin) and the PWM voltage (Vc). When the PWM voltage (Vc) is controlled by the PFC controller via the boost switches to be lower in average relative magnitude than the input voltage (Vin) (based on the tracking gain ratio), input current (Iin) will flow from the power source. Flow of the input current (Iin) allows the power factor correcting power supply to supply power to a load and maintain the boost voltage (Vboost). As the PWM voltage (Vc) is further lowered, additional input current (Iin) is supplied and therefore additional power can be supplied to the load. Accordingly, the input current (Iin) is indicative of the differences in relative magnitude between the input voltage (Vin) and the PWM voltage (Vc).

As the relative magnitude of the PWM voltage (Vc) is increased closer to the input voltage (Vin), the input current (Iin) diminishes and less power can be supplied to the load while still maintaining the boost voltage (Vboost). When the relative magnitude of the PWM voltage (Vc) is equal to the input voltage (Vin) little input current (Iin) flows. As the relative magnitude of the PWM voltage (Vc) increases above the input voltage (Vin) the power factor correcting power supply may provide power back to the power source.

Regulation of the DC output voltage may involve changing the overall voltage gain of the PFC controller to change the magnitude of the PWM voltage (Vc) generated by the opposed current converter. To increase the DC output voltage of the power factor correcting power supply, the overall voltage gain may be decreased. A decrease in the overall voltage gain decreases the amplitude of the PWM voltage (Vc). To decrease the DC output voltage, the overall voltage gain may be increased. Voltage regulation by the PFC controller may be based on the measured input voltage (Vin), the measured DC output voltage and the measured input current (Iin). In addition, further stabilization of the overall voltage gain may be achieved using the measured boost voltage (Vboost).

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

This invention includes a power factor correcting power supply. The power factor correcting power supply provides a regulated output voltage(s) using high efficiency switch mode operation. In addition, the power supply minimizes harmonics and ripple current. The power supply operates as a non-linear power electronic load with power factor correction (PFC) to increase the input power factor towards unity.

Figure 1:
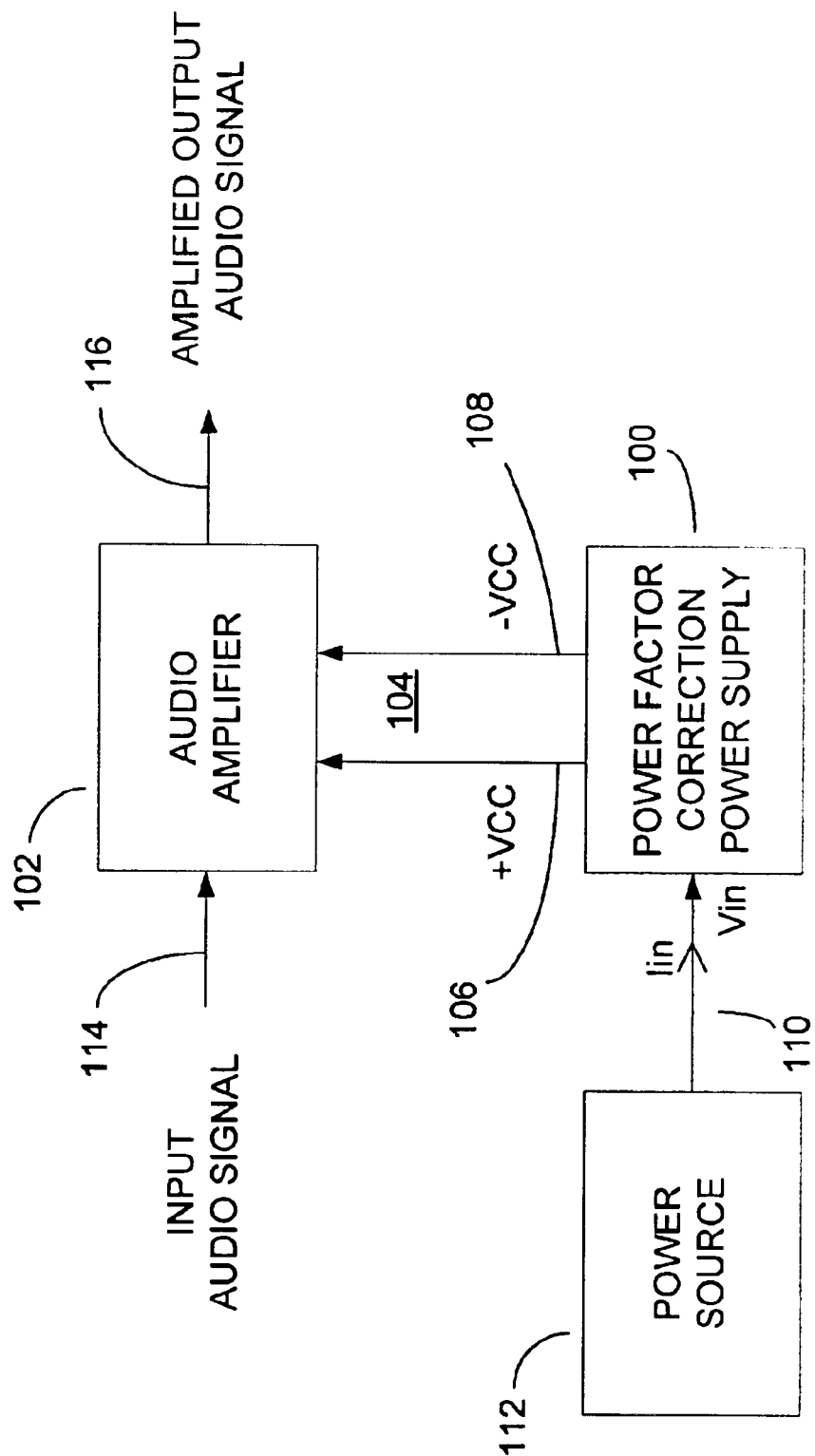
FIG. 1 is a block diagram of a power factor correcting power supply and audio amplifier.

FIG. 1 is a block diagram of a power factor correcting power supply 100 in an example application supplying regulated DC voltage to an audio amplifier 102. The power factor correcting power supply 100 provides output power on one or more output power lines 104. In the illustrated example, the output power line 104 includes a positive DC output voltage (+Vcc) provided on a positive DC rail 106, and a negative DC output voltage (−Vcc) provided on a negative DC rail 108. Other examples of the power factor correcting power supply 100 may include fewer or greater numbers of output voltages and rails. The power factor correcting power supply 100 also includes an input line 110. Input voltage (Vin) and input current (Iin) from a power source 112, such as an AC line, may be provided on the input line 110.

In the illustrated example, DC output power in the form of the positive DC output voltage (+Vcc) and the negative DC output voltage (−Vcc) is supplied to the positive and negative DC rails of the audio amplifier 102. Utilizing the DC output power, the audio amplifier 102 amplifies an input audio signal received on an audio signal input line 114 to produce an amplified output audio signal on an amplified audio signal line 116. For example, the input audio signal may originate from a microphone, and the amplified output audio signal may drive a loudspeaker. In other examples, other loads may source power from the power factor correcting power supply 100.

Figure 2:
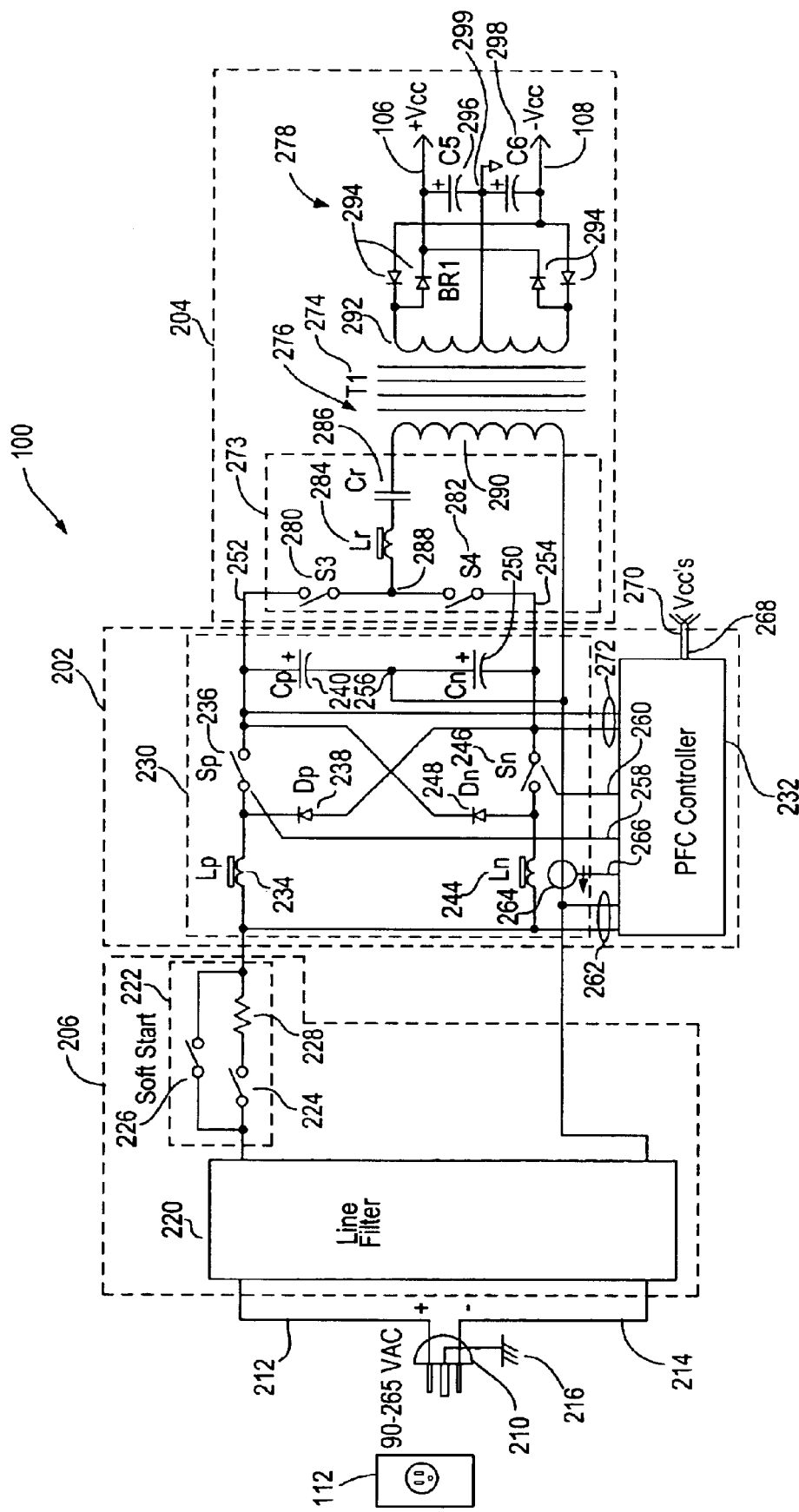
FIG. 2 is a schematic of the power factor correcting power supply illustrated in FIG. 1.

FIG. 2 is a more detailed block diagram of an example of the power factor correcting power supply 100. The power factor correcting power supply 100 includes an input stage power converter 202 and an output stage power converter 204. The power factor correcting power supply 100 may also include a pre-stage 206. As in FIG. 1, the power source 112 supplies power to the power factor correcting power supply 100. Input voltage (Vin) supplied by the power source 112 may be in a range of, for example, about 90VDC to about 265VAC.

In the illustrated example, the power factor correcting power supply 100 includes a power plug 210 capable of being detachably coupled with a single phase wall outlet that is the power source 112. The power plug 210 may include a feeder line 212, a common line 214 and a ground 216. In other examples, other voltage ranges, numbers of phases and interconnections to the power source 112 are possible. As used herein, the terms "coupled" and "electrically coupled" are defined as both direct connections and indirect connections through one or more intermediate components, where the connections conduct voltage and current.

The pre-stage 206 may include a line filter 220 and a softstart circuit 222. The line filter 220 may be any form of filter capable of reducing electromagnetic interference (EMI) caused by the input current ripple of the power factor correcting power supply 100. The softstart circuit 222 may include a first startup switch 224, a second startup switch 226 and a resistor 228, such as a positive temperature coefficient resistor. The first and second startup switches 224 and 226 may be operated to moderate inrush current during startup by switching in the resistor 228. In addition, first and second startup switches 224 and 226 may be opened upon detection of a fault to prevent the flow of fault current to the power factor correcting power supply 100. When EMI and soft start are not an issue, the pre-stage 206 is unnecessary.

The input stage power converter 202 includes an opposed current converter 230 that is controlled by a power factor correction (PFC) controller 232. The opposed current converter 230 operates as an AC to DC boost converter to raise the un-rectified AC input voltage (Vin) to a determined DC boost voltage (Vboost), such as between about 380VDC and about 400VDC. The opposed current converter 230 includes a first boost inductor (Lp) 234, a first boost switch (Sp) 236, a first boost diode (Dp) 238 and a first boost capacitor (Cp) 240. In addition, the opposed current converter 230 includes a second boost inductor (Ln) 244, a second boost switch (Sn) 246, a second boost diode 248 (Dn) and a second boost capacitor (Cn) 250. Each of the first and second boost capacitors (Cp, Cn) 240 and 250 are separately charged to the boost voltage (Vboost) by the opposed current converter 230. Thus, the opposed current converter 230 actually raises the AC input voltage (Vin) to a pair of DC boost voltages (Vboost).

An opposed-current converter is described within U.S. Pat. No. 5,657,219 to Stanley (the '219 patent), which is incorporated by reference. The opposed-current converter described in the '219 patent operates as an amplifier utilizing DC power supplied from positive and negative DC rails to provide amplified output power to a load. When operating the opposed current converter 230 as a boost converter as illustrated in FIG. 2, however, the load is AC power taken from an AC line to supply power to the DC rails. In other words, the opposed-current converter 230 is operating with "backwards" power flow as a boost converter when compared to the opposed-current converter of the '219 patent. As such, the AC line drives current into the opposed current converter 230 to supply the DC rails based on a difference in magnitude between the input voltage (Vin) and a pulse-width modulation (PWM) voltage (Vc) produced by the opposed current converter 230.

As use herein the term "PWM voltage (Vc)" refers to the average magnitude of the voltage produced by high frequency switching of the first and second boost switches (Sp, Sn) 234 and 236 in the opposed current converter 230. To perform power factor correction, the average value of the PWM voltage (Vc) may be maintained in a sinusoid of the same frequency and phase as the line voltage (Vin). The sinusoid and the average value of the PWM voltage (Vc) is formed from a higher frequency waveform resulting from the switching of the first and second boost switches (Sp, Sn) 234 and 236. Control of the first and second boost switches (Sp, Sn) 234 and 236 controls the average magnitude of the PWM voltage (Vc) by controlling the amplitude of the sinusoidal waveform of the PWM voltage (Vc). In addition, control of the first and second boost switches (Sp, Sn) 234 and 236 controls the frequency and phase of the sinusoidal waveform of the PWM voltage (Vc).

As in the '219 patent, the illustrated opposed current converter 230 is a half bridge configuration that operates to filter the line ripple currents by the optimum use of interleave. The input ripple currents are therefore doubled in frequency and minimized in amplitude. Minimization of the ripple current minimizes undesirable currents and therefore improves power factor. In addition, the line filter 220 may be built more economically since the minimized ripple current may require less filtering of the input power to become regulatory compliant. The opposed current converter 230 utilizes double-edged natural Pulse Width Modulation (PWM) having a triangle waveform as a modulating waveform to optimize the practice of interleave.

Figure 3:
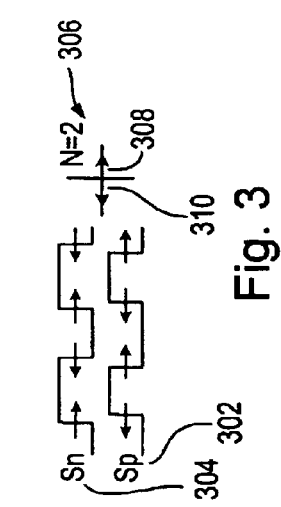
FIG. 3 is a timing diagram of an input stage power converter included in the power factor correcting power supply of FIG. 2.

FIG. 3 is a timing diagram illustrating the operation of the pair of boost switches (first boost switch (Sp) 236 and second boost switch (Sn) 246). A first modulation waveform 302 represents the operation of the first boost switch (Sp) 236 and a second modulation waveform 304 represents the operation of the second boost switch (Sn) 246. The first and second modulation waveforms 302 and 304 are PWM signals that share a substantially common time for the center of their pulses and modulate symmetrically such that the sum of their duty cycles is a constant of approximately unity.

In the illustrated modulation waveforms, the input voltage (Vin) from the power source 112 (FIG. 2) may be somewhat negative and going positive. Such a transition establishes the duty and duty trends shown by the arrows on the first and second modulation waveforms 302 and 304.

FIG. 3 also includes a modulation phasing diagram 306. The modulation phasing diagram 306 includes a first vector 308 representing modulation of the first modulation waveform 302, and a second vector 310 representing modulation of the second modulation waveform 304. The modulation waveforms 302 and 304 illustrated in FIG. 3 are evenly spaced around the modulation phasing diagram 306 at about 180 degrees apart.

In FIG. 2, a first side of the first and second boost inductors (Lp, Ln) 234 and 244 are electrically coupled with feeder line 212 from the power source 112. The second side of the first and second boost inductors (Lp, Ln) 234 and 244 are electrically coupled with one side of respective first and second boost switches (Sp, Sn) 236 and 246, and one side of respective first and second boost diodes (Dp, Dn) 238 and 248. The other side of the first and second boost switches (Sp, Sn) 236 and 246 are coupled with the other side of respective second and first boost diodes (Dn, Dp) 248 and 238, one side of respective first and second boost capacitors (Cp and Cn) 240 and 250, and respective first and second boost voltage output lines 252 and 254. The other side of first and second boost capacitors (Cp and Cn) 240 and 250 are electrically coupled with a boost centerpoint 256. The boost centerpoint 256 is also electrically coupled with the common line 214.

The first and second boost inductors (Lp, Ln) 234 and 244 are magnetized and demagnetized by the operation of the first and second boost switches (Sp, Sn) 236 and 246. Power to magnetize the first and second boost inductors (Lp, Ln) 234 and 244 is provided from the power source 112 and also from the first and second boost capacitors (Cp and Cn) 240 and 250. The first and second boost switches (Sp, Sn) 236 and 246 are connected between the first and second boost inductors (Lp, Ln) 234 and 244 and the first and second boost capacitors (Cp, Cn) 240 and 250. Thus, voltage stored in the first boost capacitor (Cp) 240 may contribute to the voltage available from the power source 212 to magnetize the first boost inductor (Lp) 234. Similarly, voltage stored in the second boost capacitor (Cn) 250 may contribute to the voltage available from the power source 212 to magnetize the second boost inductor (Ln) 244.

Energy stored in the second boost capacitor (Cn) 250 is derived from the demagnetization of the first boost inductor (Lp) 234. Likewise energy stored in the first boost capacitor (Cp) 240 is derived from the demagnetization of the second boost inductor (Ln) 244. The first boost inductor (Lp) 234 is magnetized with a positive inductor voltage and a negative current (e.g. the fourth quadrant of a V-I plane). The convention should be understood to be that negative current flows out of the input stage 202 towards the power source 212. In addition, it should be understood that the positive terminal of each of the first and second boost inductors (Lp, Ln) 234 and 264 is electrically coupled with the first and second boost switches (Sp, Sn) 236 and 246, respectively.

As such, when the first boost switch (Sp) 236 is open (demagnetizing mode of first boost inductor (Lp) 234), negative current flows from the common line 214 through the second boost capacitor (Cn) 250, the first boost diode (Dp) 238 and the first boost inductor (Lp) 234 to the feeder line 212. The second boost inductor (Ln) 244, on the other hand is magnetized with energy that is a negative inductor voltage and a positive current (e.g. the second quadrant). Accordingly, when the second boost switch (Sn) 246 is open, positive current flows from the feeder line 212 through the second boost inductor (Ln) 244, the second boost diode (Dn) 248 and the first boost capacitor (Cp) 240 to the common line 214.

Demagnetization of the first boost inductor (Lp) 234 begins when the first boost switch (Sp) 236 opens and allows current to flow from the first boost inductor (Lp) 234 through the first boost diode (Dp) 238 and into the second boost capacitor (Cn) 250. Demagnetization of the first boost inductor (Lp) 234 ends and magnetization resumes when the first boost switch (Sp) 236 closes. Likewise, demagnetization of the second boost inductor (Ln) 244 begins when the second boost switch (Sn) 246 opens and allows current from the second boost inductor (Ln) 244 to flow through the second boost diode (Dn) 248 and into the first boost capacitor (Cp) 240.

Demagnetization of the second boost inductor (Ln) 244 ends and magnetization resumes when the second boost switch (Sn) 246 closes. Magnetization is expedited by the fact that the power source 212 is in the negative portion of the cycle whenever the first boost inductor (Lp) 236 is to carry large negative inductor currents or positive input current (Iin). In a similar manner the line 112 is in the positive portion of the cycle whenever the second boost inductor (Ln) 246 is to carry large positive inductor currents or negative input current (Iin). When the input voltage (Vin) is substantially of the same waveshape as the input current (Iin) a high power factor results as the converter is functioning as a resistive load.

An efficient magnetizing cycle allows the use of larger values of boost inductance for the first and second boost inductors (Lp, Ln) 234 and 244 without becoming input current (Iin) slew rate limited. Having larger values of boost inductance in turn reduces the ripple current imposed on the power source 112. The voltages stored on the first and second boost capacitors (Cp, Cn) 240 and 250 are larger than the largest peak voltage supplied by the power source 112. If this were not so, unintended currents would flow through the first and second boost diodes (Dp, Dn) 238 and 248 during peaks of the input voltage (Vin).

The voltage of the first and second boost capacitors (Cp, Cn) 240 and 250 is therefore boosted above the input voltage (Vin). For example, operation with line voltages (Vin) as high as about 265V RMS may require the voltages of the individual first and second boost capacitors (Cp, Cn) to be boosted to about 380VDC to about 400VDC. In this example, the boost switches (Sp) 236 and (Sn) 246 and boost diodes (Dp) 238 and (Dn) 248 may be exposed to a total voltage of about 760VDC to about 800VDC.

The PWM voltage (Vc) and a peak charging current (Ic) provided to the first and second boost capacitors (Cp, Cn) 240 and 250 is a sinusoidal waveform created by the cooperative operation of the first and second boost switches (Sp, Sn) 236 and 246. The amplitude and therefore average value of the waveform of the PWM voltage (Vc) may also be controlled by cooperative operation of the first and second boost switches (Sp, Sn) 236 and 246. In addition, the magnitude of the PWM voltage (Vc) and therefore the magnitude of the peak charging current (Ic) may be controlled by cooperative operation of the first and second boost switches (Sp, Sn) 236 and 246.

During startup, the first charging of the boost capacitors (Cp, Cn) 240 and 250 may come from the line voltage (Vin) of the power source 112 and the low-frequency peak charging current (Ic). The peak charging current (Ic) may flow through the first and second boost inductors (Lp, Ln) 234 and 244 and the freewheeling first and second boost diodes (Dp, Dn) 238 and 248. The opposed current converter 230 does not need to operate producing the PWM voltage (Vc) to produce the initial boost voltage (Vboost). Inrush currents resulting from initial charging of the first and second boost capacitors (Cp, Cn) 240 and 250 can be moderated with the softstart circuit 222. By closing the first startup switch 224 and leaving open the second startup switch 226 the impedance of the resistor 228 may be used to moderate the inrush currents. Following startup-the second startup switch 226 may be closed. If a fault condition occurs, both the first startup switch 224 and the second startup switch 226 may be opened to stop the flow of input current (Iin) from the power source 112.

In the illustrated power factor correcting power supply 100, the opposed current converter 230 is coupled directly to the input voltage (Vin). A bridge rectifier stage is not used. As such, the peak-to-peak input voltage (Vin) across the first and second boost switches (Sp, Sn) 236 and 246 is twice the magnitude of what the rectified input voltage (Vin) would be following a bridge rectifier stage.

Due to the operation of the first and second boost switches (Sp, Sn) 226 and 246 at a substantially similar center of time, no additional switches, inductors and/or capacitors are required to accurately track the low-voltage portion of the input voltage (Vin) waveform and produce the PWM voltage (Vc). In addition, losses are lowered due to the elimination of a bridge rectifier stage within the power factor correcting power supply 100. High-voltage switch technologies such as insulated gate bipolar transistors (IGBTs) or other types of devices may be utilized for the first and second boost switches (Sp, Sn) 236 and 246 to accommodate the higher peak-to-peak input voltage (Vin). Alternatively, soft switching or zero voltage switching (ZVS) may be utilized with slower switching high-voltage switch technologies.

The output voltage of the opposed current converter 230 is provided on both the first boost capacitor (Cp) 240 and the second boost capacitor (Cn) 250. The output voltage of the opposed current converter 230 may also be referred to as the boost voltage (Vboost). The boost voltage (Vboost) on each of the first boost capacitor (Cp) 240 and the second boost capacitor (Cn) 250 may be a relatively high DC voltage such as about 380VDC to about 400VDC. The relatively high DC voltage may be achieved by charging the first and second boost capacitors (Cp, Cn) 240 and 250 with the PWM voltages (Vc) and peak charging current (Ic) provided by the first and second boost inductors (Lp, Ln) 234 and 244, respectively.

Switching of the first and second boost switches (Sp, Sn) 236 and 246 at a duty cycle magnetizes and demagnetizes the first and second boost inductors (Lp, Ln) 234 and 244. Control of the duty cycle produces the PWM voltage (Vc) waveform with the desired phase and magnitude to charge the first and second boost capacitors (Cp, Cn) 240 and 250. The first and second boost capacitors (Cp, Cn) 240 and 250 are each charged to the boost voltage (Vboost). Since each of the first and second boost capacitors (Cp, Cn) 240 and 250 are separately charged to the boost voltage (Vboost), the opposed current converter 230 may be subject to about twice the boost voltage (Vboost) such as about 760VDC to about 800VDC.

A boost ratio may be determined by dividing the boost voltage (Vboost) by the instantaneous value of the input voltage (Vin). At a lower input voltage (Vin) (such as 100VAC nominal in Japan) higher boost ratios are needed to achieve the desired boost voltage (Vboost). With the opposed current converter 230, however, the duty cycles of the first and second boost switches (Sp, Sn) 236 and 246 and the first and second boost diodes (Dp, Dn) 238 and 248 converge to about 50% at high output power and low input line voltages (e.g. a high boost ratio). Some boost converters, on the other hand, suffer from the diode duty cycle reaching zero while the switch duty cycle goes to 100% at low voltage in order to produce a high boost ratio.

Since the first and second boost inductors (Lp, Ln) 234 and 244 are magnetized by both the power source 112 and the first and second boost capacitors (Cp, Cn) 240 and 250, the switch duty cycle may be significantly lower. In addition, high peak currents relative to the input current (Iin) are not seen by the opposed current converter 230 compared to flyback and resonant converters. High peak currents may be avoided with larger inductances of the first and second boost inductors (Lp, Ln) 234 and 244. Since sufficient power to completely magnetize the first and second boost inductors (Lp, Ln) 234 and 244 is available, the inductances may be increased with less concern for insufficient magnetization and de-magnetization during a switch duty cycle. Insufficient magnetization and de-magnetization may be a significant cause for line current distortion at low instantaneous input voltages in some boost converters.

Transient peak input voltage immunity may also be provided by the opposed current converter 230 based on the magnitude of inductance of the first and second boost inductors (Lp, Ln) 234 and 244. When the transient peak input voltage is of insufficient duration to significantly magnetize the first and second boost inductors (Lp, Ln) 234 and 244, large transient voltages are possible without damage. Significant magnetization may be an amount of magnetization that produces peak charging currents (Ic) with magnitude large enough to over-charge the first and second boost capacitors (Cp, Cn) 240 and 250.

The inductance of the first and second boost inductors (Lp, Ln) 234 and 244 may also be designed large enough to minimize circulating currents and quiescent switching losses. For example, the inductance for 50/60 Hz operation of the power factor correcting power supply 100 may be much larger than the magnitude of inductance (and therefore power) required by wide bandwidth audio amplifier designs. Limits on the size of the first and second boost inductors (Lp, Ln) 234 and 244 may be governed by physical size limitations and inductor power losses ($I^2R$). It should also be noted that in some boost converters the use of large inductance may result in current waveform distortion at the valleys of input voltage (Vin) and input current (Iin) with low-power inputs. No such distortion occurs with the opposed current converter 230 since the opposed current converter 230 is a true AC input converter.

The physical size and magnitude of inductance of the first and second boost inductors (Lp, Ln) 234 and 244 may also be determined by considering the operational characteristics of the load supplied by the power factor correcting power supply 100. If, for example, the power factor correcting power supply 100 is supplying a load that is an audio amplifier, the physical size of the first and second boost inductors (Lp, Ln) 234 and 244 may be smaller. Since the average power output of an audio amplifier is usually much less than the audio amplifier's peak demands, the slow thermal time constant of the first and second boost inductors (Lp, Ln) 234 and 244 can be exploited to minimize their size. In this example, the first and second boost inductors (Lp, Ln) 234 and 244 can be undersized relative to a rated bench power sizing. When undersized, the first and second boost inductors (Lp, Ln) 234 and 244 may also be monitored to prevent over temperature conditions.

The PFC controller 232 may be a circuit or device that is capable of directing the opposed current converter 230 to perform power factor correction and voltage regulation. Directing the opposed current converter 230 involves controlling the switching duty (duty cycle) of the first and second boost switches (Sp, Sn) 236 and 246. The activation portion of the duty cycles maintain substantially the same center of time. In other words, the first and second boost switches (Sp, Sn) 236 and 246 are concurrently activated during a portion of each duty cycle by the PFC controller 232. The PFC controller 232 may selectively activate and deactivate the first and second boost switches (Sp, Sn) 236 and 246 with a first switch control line 258 and a second switch control line 260, respectively. The duty cycles of the first and second boost switches (Sp, Sn) 236 and 246 may be directed by the PFC controller 232 based on voltage and current sensed by the PFC controller 232.

The illustrated PFC controller 232 senses the input voltage (Vin) to the opposed current converter 230 on an input voltage sensing line 262. The input voltage (Vin) may be measured across the input side of the opposed current converter 230 by measuring between the feeder line 212 and the common line 214. The magnitude and waveform of input current (Iin) flowing from the power source 112 may be measured with a current sensor 264 such as a current transformer, a Rogowski coil, a resistive shunt or some other mechanism for sensing AC current. The current sensor 264 provides a measured input current (Iin) to the PFC controller 232 on an input current sensing line 266. The measured input current (Iin) may be scaled with a scaling factor (Ka) to form a scaled measured input current (Ka*Iin).

The positive DC output voltage (+Vcc) and the negative DC output voltage (-Vcc) present on the positive DC rail 106 and the negative DC rail 108 are also sensed by the PFC controller 232 on a positive Vcc sensing line 268 and a negative Vcc sensing line 270, respectively. The PFC controller 232 may also sense the boost voltage (Vboost) of the opposed current converter 230 on a boost voltage sensing line 272. The boost voltage (Vboost) may be measured across the output side of the opposed current converter 230 by measuring between the first boost voltage output line 252 and the second boost voltage output line 254.

Power factor correction by the PFC controller 232 implicitly involves adjustment to the sinusoidal waveform of the AC input current (Iin) supplied to the opposed current converter 230 from the power source 112. The sinusoidal waveform of the AC input current (Iin) is implicitly adjusted by adjustment to the sinusoidal waveform of the PWM voltage (Vc) supplied to the first and second boost capacitors 240 and 250. The waveform of the PWM voltage (Vc) is adjusted by switching the first and second boost switches (Sp, Sn) 236 and 246 to maintain an average waveform that is substantially identical to the sinusoidal waveform of the AC input voltage (Vin) supplied to the opposed current converter 230.

By maintaining the average waveform of the PWM voltage (Vc) substantially the same as the sinusoidal waveform of the input voltage (Vin), harmonics are minimized, and the power factor is improved. When the PWM voltage (Vc) and the input voltage (Vin) are substantially identical in waveform, the wave form of the input current (Iin) is also substantially identical in form to the sinusoidal waveform of the input voltage (Vin). Accordingly, the power factor correcting power supply 100 appears as a substantially resistive load from the perspective of the power source 112.

Voltage regulation, on the other hand, involves controlling the overall voltage gain of the PFC controller 232 as the input voltage (Vin) and the load on the power factor correcting power supply 100 vary. Control of the voltage gain again involves controlling the switching of the first and second boost switches (Sp, Sn) 236 and 246 to control the magnitude of the PWM voltage (Vc) and therefore the peak charging current (Ic) supplied to the boost capacitors (Cp, Cn) 240 and 250. The magnitude of the PWM voltage (Vc) of the opposed current converter 230 may be varied to maintain the desired voltage on the positive DC rail 106 and the negative DC rail 108.

As previously discussed, the opposed current converter 230 is operating as a "backwards" amplifier. To supply DC output power to the DC rails (via boost voltage (Vboost)), the power source 112 "pushes" input current (Iin) into the opposed current converter 230. For the input current (Iin) to flow in, the magnitude of the input voltage (Vin) should be maintained above the relative magnitude of the PWM voltage (Vc) based on a "tracking gain ratio." The "tracking gain ratio" is defined as a desired ratio of the magnitude of the AC input voltage (Vin) to the magnitude of the average AC PWM voltage (Vc). The PWM voltage (Vc) is produced by the opposed current converter 230 to charge the first and second boost capacitors (Cp, Cn) 240 and 250 to the boost voltage (Vboost).

When the relative magnitude of the input voltage (Vin) is substantially the same (based on the tracking gain ratio) as the magnitude of the PWM voltage (Vc), the magnitude of input current (Iin) flowing into the opposed current converter 230 will be minimal. As the magnitude of the PWM voltage (Vc) is lowered with respect to the relative magnitude of the input voltage (Vin) (based on the tracking gain ratio), the magnitude of the input current (Iin) flowing into the opposed current converter 230 will proportionally increase. Similarly, increases in the magnitude of the PWM voltage (Vc) with respect to the relative magnitude of the input voltage (Vin) (based on the tracking gain ratio) will decrease the magnitude of input current (Iin) flowing into the opposed current converter 230.

Figure 4:
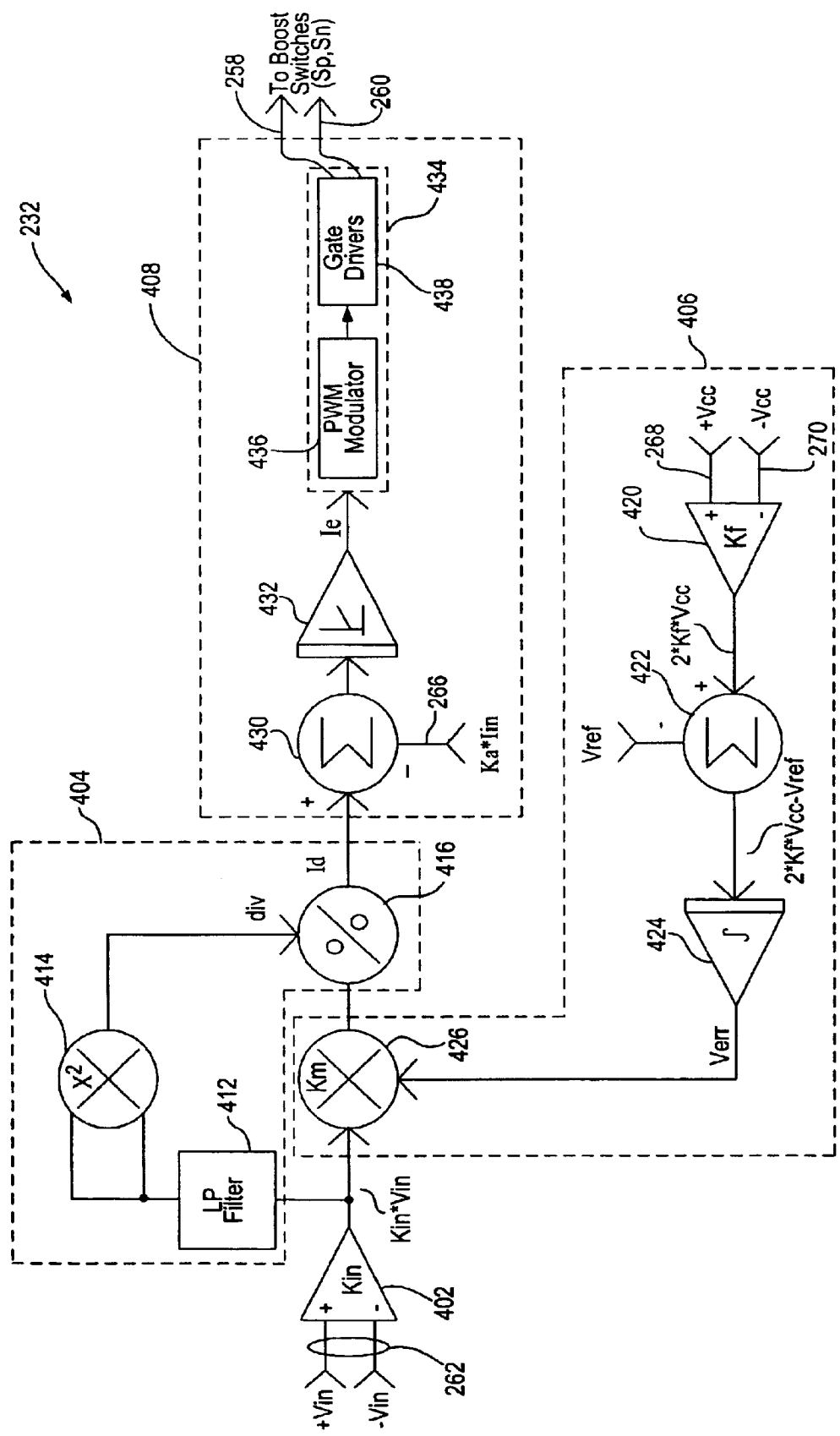
FIG. 4 is a schematic of a power factor correction controller included in the power factor correcting power supply illustrated in FIG. 2.

FIG. 4 is an example of the PFC controller 232 that is similar to Texas Instruments/Unitrode UC3854. The illustrated PFC controller 232 includes a differential amplifier 402, an input voltage feedforward control loop 404, an output voltage feedback control loop 406 and a current controlled inner loop 408. The differential amplifier 402 operates with a scaling factor (Kin) to scale the input voltage (Vin) received on the input voltage sensing line 262 to a determined voltage magnitude. The scaled input voltage (Kin*Vin) is then provided to the input voltage feedforward control loop 404 and the output voltage feedback control loop 406.

The input voltage feedforward control loop 404 includes a low pass (LP) filter 412, a squaring multiplier 414 and a divider 416. The LP filter 412 operates to extract the DC or average value of the scaled input voltage (Kin*Vin). The LP filter 412 may also include rectification of the input voltage (Vin) prior to extraction of the average value of the input voltage (Vin). When a bridge rectifier is included prior to the input stage power converter 202 (FIG. 2), the input voltage (Vin) does not change polarity and therefore no rectification with the LP filter 412 is needed. The squaring multiplier 414 squares the average value of the scaled input voltage (Kin*Vin) provided by the LP filter 412. The squared value of the scaled input voltage (Kin*Vin) is provided as the denominator of the divider 416.

Control of the duty cycle of the first and second boost switches 236 and 246 (FIG. 2) may be with the input voltage feedforward control loop 404. The duty cycle may be controlled based on a range of input voltages (Vin) provided to the power factor correcting power supply 100 from the power source 112 (FIG. 1). The input voltage feedforward control loop 404 therefore provides one feedforward technique to keep the input stage power converter 202 (FIG. 2) functioning at steady average input power with changing input voltages (Vin). In other examples, other techniques may be used to achieve similar function.

The output voltage feedback control loop 406 includes a differential receiver 420, a summer 422, an integrator 424 and a multiplier 426. The differential receiver 420 receives the positive DC output voltage (+Vcc) from the positive Vcc sensing line 268, and the negative DC output voltage (−Vcc) from the negative Vcc sensing line 270. The differential receiver 420 may scale the difference of the positive DC output voltage (+Vcc) and the negative DC output voltage (−Vcc).

In single phase applications, the differential receiver 420 may also include a determined gain constant (Kf). The gain constant (Kf) may scale the output voltage of differential receiver 420 to be compatible with the operating voltage of the differential receiver 420. A scaled version of a desired DC output voltage (Vref) is subtracted from the scaled difference voltage (2*Kf*Vcc) by the summer 422. Line current distortion in single-phase circuits may be materially degraded when the response speed of the output voltage feedback control loop 406 is too fast. The control may therefore be slowed with the integrator 424. The integrator 424 may also operate as proportional integrator (PI) controller by including a proportional term in the output of the integrator 424. The output of the summer 422 is integrated by the integrator 424 and provided as a voltage error correction signal (Verr) to the multiplier 426.

The voltage error correction signal (Verr) is a highly filtered signal representative of the error voltage between the actual DC output voltage (+Vcc, −Vcc) and the reference voltage (Vref). The multiplier 426 multiplies the scaled input voltage (Kin*Vin) by the voltage error correction signal (Verr). The multiplier 426 may also include a gain constant (Km) for adjusting the gain coefficient. The result is provided as the numerator to the divider 416, and is scaled by the squared value of the scaled input voltage (Kin*Vin). The divider 416 produces a scaled version of a desired current waveform (Id). The desired current waveform (Id) is one that can achieve substantially unity power factor. The desired current waveform (Id) is provided to the current controlled inner loop 408.

The current controlled inner loop 408 includes a summer 430, an error amplifier 432 and a switch controller 434. The summer 430 subtracts the scaled measured input line current (Ka*Iin) received on the input current sensing line 266 from the desired current waveform (Id) to produce a current error signal (Ie). The error amplifier integrates to form the current error signal (Ie) and provides a proportional error to drive the switch controller 434 to produce the peak charging current (Ic) and the PWM voltage (Vc). The switch controller 434 is driven by the proportional error to control the effective input impedance of the opposed current converter 230 (FIG. 2) by control of the transconductance through the opposed current converter 230.

The effective input impedance of the opposed current converter 230 is the PWM voltage (Vc) subtracted from the input voltage (Vin) divided by the input current (Iin). Control of the effective input impedance controls the phasing of the waveform of the AC input current (Iin) and therefore the power factor. The modest amounts of negative current feedback may have the effect of increasing the effective input impedance of the opposed current converter 230 (FIG. 2). Variations in the effective input impedance of the opposed current converter 230 may be achieved with the duty cycles of the first and second boost switches (Sp, Sn) 236 and 246. The duty cycles may be selectively varied to adjust the transconductance and therefore the effective input impedance of the opposed current converter 230.

With the PFC controller 232 illustrated in FIG. 4, control of the transconductance is predominantly based on the input line current (Iin) of the inner current control loop 408. Differences in the magnitude of the PWM voltage (Vc) and the input voltage (Vin) may be determined based on the flow of the input current (Iin). In other words, a larger magnitude of the PWM voltage (Vc) (e.g. higher voltage gain) results in lower peak charging current (Ic). Similarly, a smaller magnitude of the PWM voltage (Vc) (e.g. lower gain) results in a higher peak charging current (Ic). Based on the magnitude of input line current (Iin), the overall voltage gain of the PFC controller 232 may be adjusted.

The switch controller 434 may include a pulse width modulation (PWM) modulator 436 and a plurality of gate drivers 438 to drive the boost switches of the opposed current converter 230. In the example illustrated in FIG. 2, the first and second boost switches (Sp, Sn) 236 and 246 are driven to control the magnitude of the PWM voltage (Vc). The first and second boost switches (Sp, Sn) 236 and 246 (FIG. 2) may be driven via the first switch control line 258 and the second switch control line 260, respectively.

To drive the opposed current converter 230, the PWM modulator 436 may operate with double edged natural PWM to optimize the use of interleave. With double edged natural PWM, the modulating waveform is a triangle waveform and the modulated signal is a continuous variable of time. Accordingly, the PWM modulator operates with an interleave of N, where N equals the number of boost switches and gate drivers 438. In the illustrated example, the opposed current converter 230 (FIG. 2) includes two boost switches (first and second boost switches (Sp, Sn) 236 and 246), therefore N=2. As described later, in other examples, additional boost switches may be included.

Figure 5:
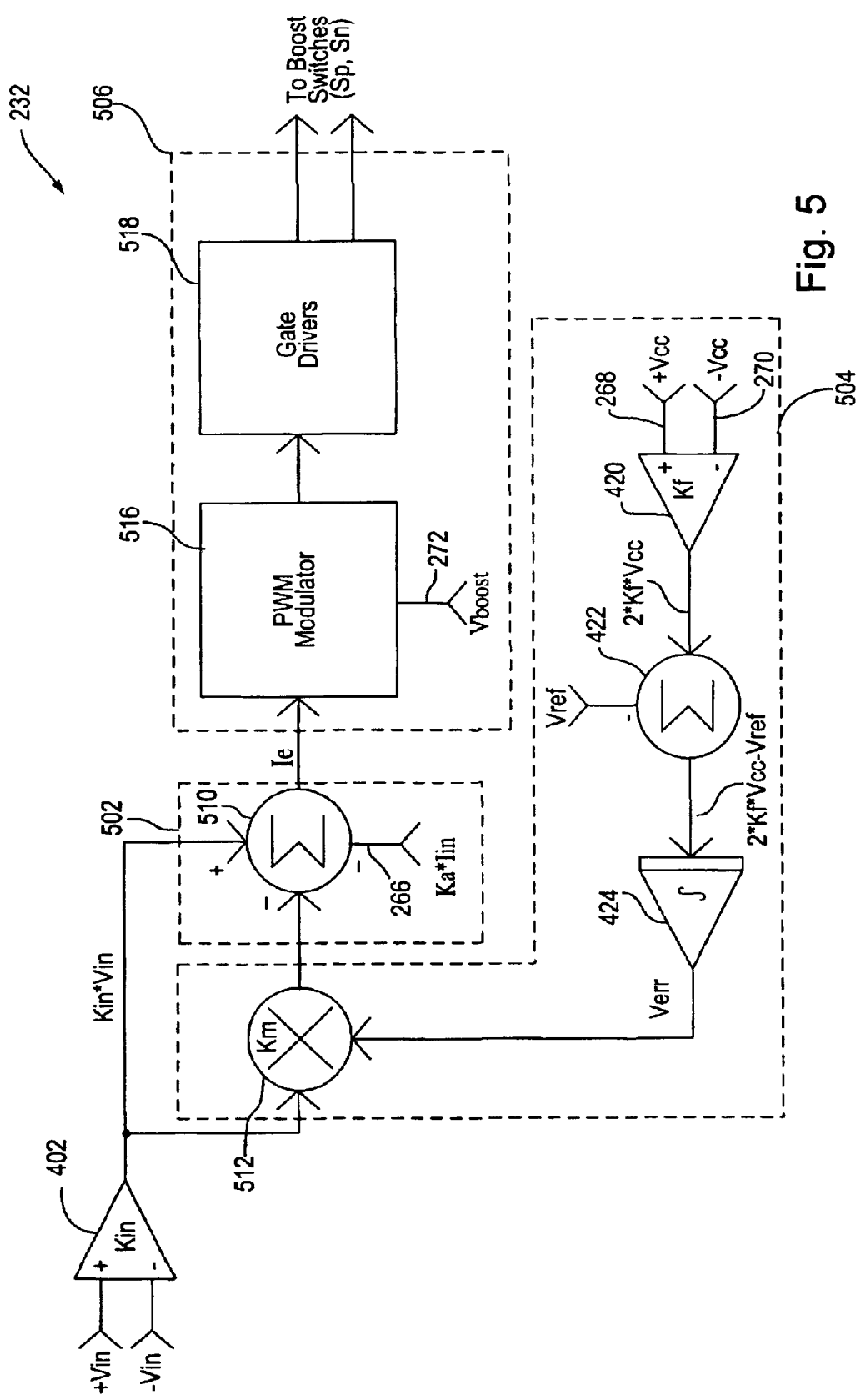
FIG. 5 is another schematic of a power factor correction controller included in the power factor correcting power supply illustrated in FIG. 2.

FIG. 5 is another example of a PFC controller 232 having a different control structure than was discussed with reference to FIG. 4. For purposes of brevity, the following discussion will focus on those differences. In this example, the voltage gain is predominately controlled by the PFC controller 232 based on the input voltage (Vin). The PFC controller 232 of FIG. 5 includes the differential amplifier 402, an input voltage feedforward control loop 502, an output voltage feedback control loop 504 and a voltage controlled inner loop 506. The differential amplifier 402 provides the scaled input voltage (Kin*Vin) to a summer 510 included in the input voltage feedforward control loop 502.

The output voltage feedback control loop 504 includes the differential receiver 420, the summer 422 and the integrator 424 similar to FIG. 4. In addition, the output voltage feedback control loop 504 includes a multiplier 512 that multiplies the scaled input voltage (Kin*Vin) by the voltage error correction signal (Verr). The result is provided to the summer 510. The summer 510 subtracts the voltage error correction signal (Verr*Km*Kin*Vin) and the scaled measured input current (Ka*Iin) from the scaled input voltage (Kin*Vin) to produce a current error signal (Ie) to drive the switch controller 506. The switch controller 506 includes a PWM modulator 516 and a plurality of gate drivers 518.

Similar to the PWM modulator 436 of FIG. 4, the PWM modulator 516 operates with an interleave of N to direct the duty cycle of the boost switches in the opposed current converter 230 (in the example of FIG. 2, N=2). The PWM modulator 516 of FIG. 5, however, also includes an additional feedforward control loop. The boost voltage (Vboost) is provided as a feedforward signal to the PWM modulator 516 on the boost voltage sensing line 272. The inner voltage control loop 506 provides control of the scaling of the modulating waveform produced by the PWM modulator 516. The modulating triangle waveform may be scaled to be proportional to the desired boost voltage (Vboost). The additional feedforward control loop provides gain stabilization of the current error signal (Ie) provided from the summer 510.

The voltage gain of the voltage controlled inner loop 506 may be fixed based on the tracking gain ratio. Accordingly, the PWM modulator 516 may be inverse gain compensated for errors in the boost voltage (Vboost) on the boost capacitors. Without such compensation, the gain of the PWM modulator 516 would be proportional to the boost voltage (Vboost) of the boost capacitors, i.e. not fixed but variable. With this control method, the PFC controller 232 includes an inner control loop (voltage controlled inner loop 506) that is linear in duty to provide voltage control when the PWM voltage (Vc) of the opposed current converter 230 is amplitude controlled based on the boost voltage (Vboost). A similar type of feedforward control loop for gain stabilization may also be implemented in the PFC controller 232 discussed with reference to FIG. 4.

In the example PFC controller 232 of FIG. 5, the input voltage feedforward control loop 502 establishes the scaled input voltage (Kin*Vin) as the dominant signal to the voltage controlled inner loop 506. The voltage controlled inner loop 506 includes a voltage gain of (1/Kin). The voltage gain (1/Kin) cancels Kin and leaves only the input voltage (Vin) as the control signal to generate the PWM voltage (Vc) under no load conditions. As a result, during quiescent conditions (e.g. little or no load on the power factor correcting power supply) the first converter stage 202 (FIG. 2) may track the input voltage (Vin) with the PWM voltage (Vc). The input voltage (Vin) may be tracked by the PWM voltage (Vc) based on the tracking gain ratio. The opposed current converter 230 may therefore not transfer power by default. Operation of the opposed current converter 230 using the PFC controller 232 of FIG. 5 may best be described as a reverse amplifier form of operation. Reverse amplifier operation is opposite of traditional amplifier operation where the amplifier is driven to have an output of an expected form instead of tracking the input as is the case here.

Since the feedforward control loop operates with the scaled input voltage (Kin*Vin) as the dominant control signal, the impact of the voltage error correction signal (Verr) from the output voltage feedback control loop 504 is minimized. The voltage error correction signal (Verr) may be minimized without compromising voltage regulation of the power factor correcting power supply 100 (FIG. 1) due to the feedforward control provided by the voltage controlled inner loop 506. As a result of the additional feedforward control with the boost voltage (Vboost), the multiplier 512 may manage only a fraction of the feedforward control signal. In addition, the multiplier 512 may have less dynamic range. Accordingly, the multiplier 512 may be less precise, and less expensive than the multiplier 426 discussed with reference to FIG. 4.

During non-quiescent conditions, the PFC controller 232 of FIG. 5 may use relatively modest amounts of negative current feedback in the form of the scaled measured input current (Ka*Iin) to control the effective input impedance of the opposed current converter 230 (FIG. 2). Control of the effective input impedance controls the power factor as previously discussed In addition, during non-quiescent conditions, the overall voltage gain may be adjusted to regulate the DC output voltage (the positive and negative DC output voltages (+Vcc and −Vcc)) of the power factor correcting power supply 100 (FIG. 1). Adjustment of the overall voltage gain may occur through the output voltage feedback control loop 504 as previously discussed. As the overall voltage gain of the PFC controller 232 is varied, the opposed current converter 230 may either acquire power from the power source 112 (FIG. 1), or return power to the power source 112 in a well-controlled manner.

The input stage power converter 202 may therefore operate in the first and third quadrants as a source of power to the power source 112 and the second and fourth quadrants to consume power from the power source 112. When the PFC controller 232 produces an overall feed-forward amplifier gain that is less than unity, power is flowing into the opposed current converter 230. When the overall voltage gain is greater than unity, on the other hand, power is flowing out of the opposed current controller 232 to the power source 112.

To vary the overall voltage gain of the PFC controller 232 to be about unity, the multiplier 512 contributing to control of the voltage gain may be at least a two-quadrant multiplier (operating in quadrants two and four) with the input voltage (Kin*Vin) presented to a bipolar input of the multiplier 512. The overall voltage gain of the PFC controller 232, without consideration of the multiplier 512 and the voltage controlled inner loop 506, may be set to slightly greater than unity by adjusting a scaling factor (Kin) of the scaling amplifier 402 or scaling within the summer 510. The multiplier 512 may therefore be used to reduce the overall voltage gain.

In this control strategy, the entire needed working range of the multiplier 512 may be two-quadrant. The multiplier 512 may be two-quadrant since the output voltage feedback control loop 504 will only be required to bias the multiplier 512 into operation with the voltage error correction signal (Verr) as loading on the power factor correcting power supply 100 (FIG. 1) increases. Since the need to return power to the power source 112 should be minimal, the multiplier 512 does not need to support four quadrant operation.

Alternatively, the multiplier 512 may support four quadrant operation. Accordingly, the PFC controller 232 may control the opposed current converter 230 (FIG. 2) to source power to, or consume power from the power source 112 (FIG. 1). In support of four quadrant operation, the overall voltage gain of the PFC controller 232, without consideration of the multiplier 512, and the voltage controlled inner loop 506 may be set to substantially unity. As a result, the multiplier 512 may adjust the overall voltage gain both above and below unity.

Energy may be returned to the power source 112 (FIG. 1) when the boost capacitors of the opposed current converter 230 (FIG. 2) have stored excess energy. The primary causes of excesses of stored energy may be due to surges of the power source 112 and control overshoot in the output voltage feedback control loop 504 or the voltage controlled inner loop 506. Should the voltages on the boost capacitors be hazardous to the input and output converters 202 and 204 (FIG. 2), the PFC controller 232 may disable all switching of the opposed current converter 230 until the voltage bleeds down to safe levels.

Figure 6:
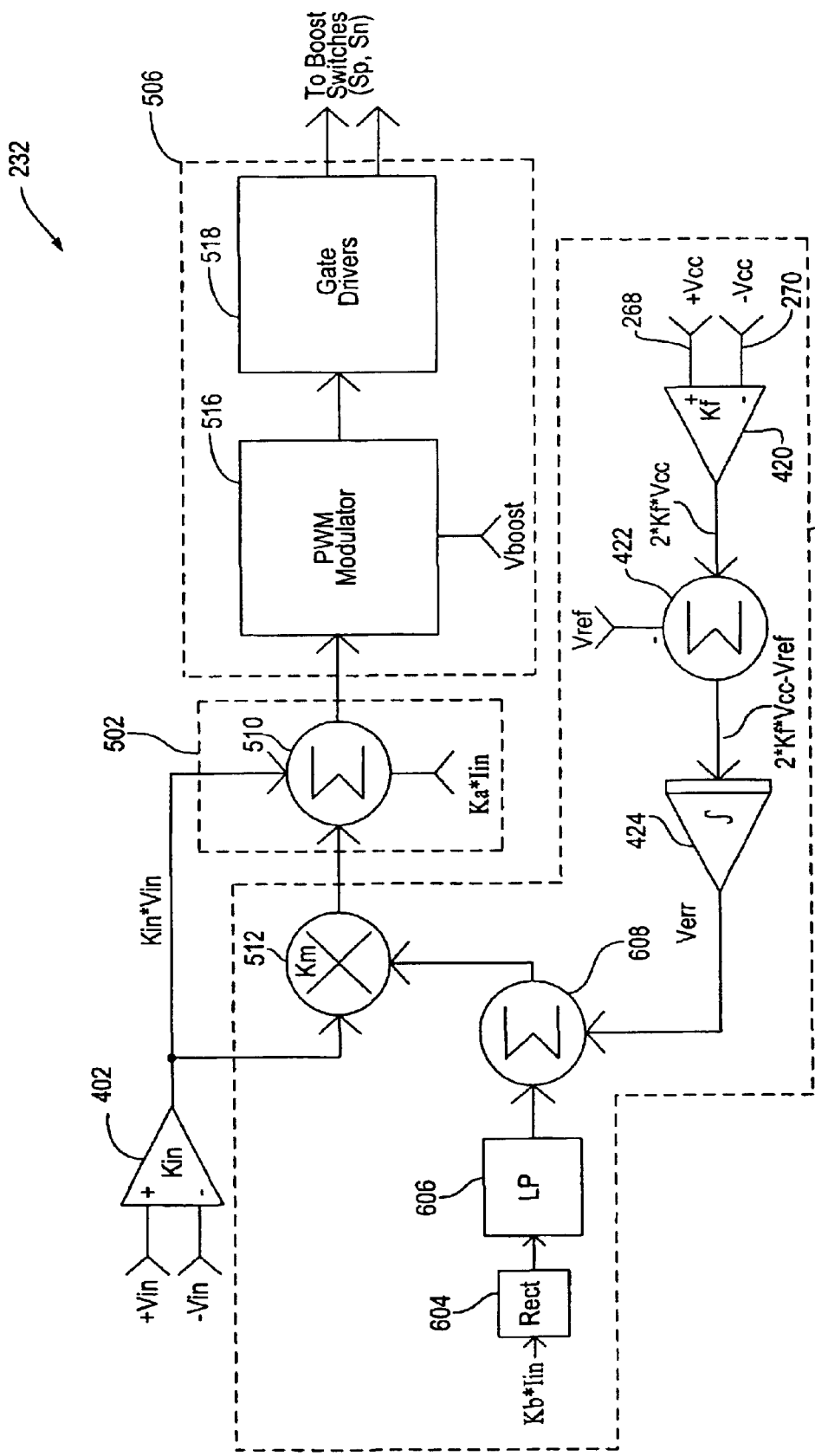
FIG. 6 is yet another schematic of a power factor correction controller included in the power factor correcting power supply illustrated in FIG. 2.

FIG. 6 is yet another example PFC controller 232. In this example, the PFC controller 232 includes the differential amplifier 402, the input voltage feedforward control loop 502 and the voltage controlled inner loop 506 similar to FIG. 5. The differential amplifier 402, the input voltage feedforward control loop 502 and the voltage controlled inner loop 506 all function similarly to the example of FIG. 5. The PFC controller of FIG. 6 also includes an output voltage feedback control loop 602 that is similar to the output voltage feedback control loop 504 discussed with reference to FIG. 5.

The output voltage feedback control loop 602, however, includes the additional elements of a rectifier 604, a low pass (LP) filter 606 and a summer 608. The rectifier 604, the low pass filter 606 and the summer 608 introduce the measured input current (Iin) to the output voltage feedback control loop 602. The measured input current (Iin) may be scaled with a scaling factor (Kb) to form a scaled measured input current (Kb*in).

The scaled measured input current (Kb*Iin) may be provided to the rectifier 604. The rectifier 604 may provide rectification of the scaled measured input current (Kb*Iin). Where the input current (Iin) is already rectified, as is the case where a bridge rectifier is included prior to the input stage power converter 202, the measured input current (Iin) does not change polarity, and the rectifier 604 is therefore unnecessary. The average of the rectified, scaled, measured input current (Kb*Iin) is filtered by the LP filter 606. Following filtering, the filtered, rectified, scaled measured input current (Kb*Iin) is added by the summer 608 to the voltage error correction signal (Verr) to provide "super regulation" of the DC output voltage (the positive and negative DC output voltages (+Vcc and −Vcc)).

Super-regulation may be derived by sensing the average magnitude of measured input current (Iin) drawn by the input stage power converter 202 (FIG. 2). The DC output voltage (the positive and negative DC output voltages (+Vcc and −Vcc)) may then be adjusted in response to the average magnitude of measured input current (Iin). When the DC output voltage is raised, the effect is to lower any effective supply impedance and therefore increase the average magnitude of measured input current (Iin). Similarly, when the DC output voltage is lowered, effective supply impedance is raised and the average magnitude of measured input current (Iin) decreases. If sufficient current feedback is applied, the DC output voltage will increase with increased power draw. Such a response is by definition a negative output resistance.

Super regulation increases the amount of instantaneous negative current feedback used on the voltage controlled inner control loop 506. With relatively large amounts of instantaneous negative current feedback, such as in the current controlled inner loop 408 of the PFC controller 232 illustrated in FIG. 4, however, super regulation is unnecessary. With smaller amounts of negative current feedback as in FIGS. 5 and 6, however, increasing the instantaneous negative current feedback reduces the distortion of the input current (Iin) resulting from small duty-to-voltage conversion errors. As the input impedance of the input stage power converter 202 (the boost converter) becomes very low, small distortions in the PWM voltage (Vc) may represent large distortions in the input current (Iin). Increasing the impedance of the first power stage converter 202 through negative current feedback may relax the linearity requirements on the first power stage converter 202. Regulation of the DC output voltage may, however, be affected.

Similar to the PFC controller 232 described with reference to FIG. 5, line current distortion in single phase PFC circuits is materially degraded by a response speed of the output voltage feedback control loop 602 that is too fast. The response speed of the output voltage feedback control loops 504 and 602 of the PFC controllers 234 illustrated in FIGS. 5 and 6 may therefore be slow to moderate. The same slowness however, may make response to loading or input voltage (Vin) changes difficult to rapidly track.

The super-regulation of FIG. 6 achieves improvement in response speed. The improved response speed may be achieved even though the added feedback of the measured input current (Iin) should also not be too fast to avoid adding to distortion of the input current (Iin). The ripples of the control correction signals (voltage error correction signal (Verr) and rectified, scaled, measured input current (Kb*Iin)) may be phased. The ripples may be phased such that the net ripple is less than would have been contributed by either control correction signal alone.

In FIG. 2, the illustrated output stage power converter 204 receives the boost voltage (Vboost) and current from the opposed current converter 230 on the first boost voltage output line 252 and the second boost voltage output line 254. Alternatively, the output stage power converter 204 may be omitted when the boost voltage (Vboost) is useable directly to power a load. The peak currents supplied to the output stage power converter 204 may be effectively halved without using a full-bridge form within the second power converter 204. The peak currents have been effectively halved by doubling the magnitude of the input voltage (Vin) supplied to the input stage power converter 202 as previously discussed.

The output stage power converter 204 may be a circuit or device(s) capable of providing voltage conversion of the boost voltage (Vboost) provided by the input stage power converter 202 and galvanic isolation of the DC output power provided by the output stage power converter 204. The example output stage power converter 204 is a DC-to-DC power converter that includes a half bridge series resonant switch mode converter 273. In other examples, a full bridge series resonant switch mode converter, or any other switch mode converter configuration providing similar functionality may be utilized.

The series resonant half-bridge is particularly appropriate in the example power factor correcting power supply 100, since it may not be desirable to force the boost voltage on each of the first and second boost capacitors (Cp, Cn) 240 and 250 to remain in balance at low frequencies. Balanced boost voltages (Vboost) may be unobtainable since the AC ripple of the boost voltage (Vboost) at power source frequencies may be anti-phase on the first and second boost capacitors (Cp, Cn) 240 and 250.

The illustrated output stage power converter 204 includes a transformer (T1) 274 having a primary side 276 and a secondary side 278. The primary side 276 includes a first switch (S3) 280, a second switch (S4) 282, a resonant inductor (Lr) 284 and a resonant capacitor (Cr) 286. The first and second switches (S3, S4) 280 and 282 are electrically coupled with the respective first and second boost voltage output lines 252 and 254 on one side and a resonant centerpoint 288 on the other side. The resonant inductor (Lr) 284 is coupled in series between the resonant centerpoint 288 and the resonant capacitor (Cr) 286.

The transformer 274 includes a primary winding 290 and a secondary winding 292 that provide galvanic isolation of the secondary side 278. The primary winding 290 is electrically coupled with the resonant capacitor (Cr) 286 and the common line 214 of the power source 112. The secondary side 278 includes a plurality of secondary diodes (BR1) 294 forming a bridge rectifier. In addition, the secondary side 278 includes a first secondary capacitor (C5) 296 and a second secondary capacitor (C6) 298 for final filtering of the DC output power of the power factor correcting power supply 100. The DC output power includes the positive DC output voltage (+Vcc) provided on the positive DC rail 106 and the negative DC output voltage (−Vcc) provided on the negative DC rail 108. The first secondary capacitor (C5) 296 is electrically coupled between the positive DC rail 106 and a ground connection 299. The second secondary capacitor (C6) 298 is coupled between the negative DC rail 108 and the ground connection 299.

The first and second switches (S3, S4) 280 and 282 may be directed by an output stage switch mode controller (not shown) to operate with series resonant discontinuous switching mode (DCM) control to convert the boost voltage (Vboost) to the first and second DC output voltages (+Vcc, −Vcc). The output stage power converter 204 may be unregulated to allow the first and second switches (S3, S4) 280 and 282 to remain in the discontinuous mode of operation where the switches turn off at zero current. By managing the deadtime the switches can also be turned on at zero voltage. This is known as zero voltage switching (ZVS) and may be used to minimize switching losses in the first and second switches (S3, S4) 280 and 282. Control of the input stage power converter 202 on the other hand, is with the PFC controller 232 and includes voltage regulation as previously discussed. Thus, voltage regulation of the output stage power converter 204 is unnecessary. The output stage power converter 204 may also return resonant current to the resonant centerpoint 288 when the PFC controller 232 controls the input stage power converter 202 to supply power to the power source 112. During startup, the output stage power converter 204 can also start operation immediately and charge the first and second secondary capacitors (C5, C6) 296 and 298 without requiring a separate soft-start mode of control.

The operating frequency of the output stage power converter 204 may be fixed. The output stage power converter 204 is inserted between the input stage power converter 202 and the load, such as an audio amplifier 102 (FIG. 1). In this configuration, the output stage power converter 204 may be adequate to filter and decouple the switching noise of variable frequency operation of the input stage power converter 202 from the switch-mode operation of the load. The power factor correcting power supply 100 may supply an audio amplifier 102 (FIG. 1). The frequency of the output stage power converter 204 may be synchronized to the fixed frequency of operation of the switch-mode audio amplifier 102 to avoid beat tones in the amplified audio output signal of the audio amplifier 102.

Due to the filtering provided by the output stage power converter 204, the PFC controller 232 may direct the operation of the opposed current converter 230 to operate with FM (frequency modulation). Since the input stage power converter 202 is not resonant, substantial FM is possible. The use of FM of the input stage power converter 202 can improve electromagnetic magnetic interference (EMI) control and therefore further reduce the cost, size and weight of the line filter 220 that may be used to remove line conducted switching noise.

The PFC controller 232 and the output stage switch mode controller may also galvanically isolate the respective gate drivers of the switches. Accordingly, the PFC controller 232 and the output stage switch mode controller may be ground referenced to the ground 299 at the secondary side of the output stage power converter 204. The DC output voltage (first and second DC output voltages (+Vcc, −Vcc)) is useable directly as the regulated variable. If the PFC controller 232 is on the ground-referenced side of the input and output stage power converters 202 and 204, then the signals provided on the input voltage sensing line 262 and the input current sensing line 266 should also be galvanically isolated. The sensing of Vboost to provide feedforward gain control of modulator 516 should also be galvanically isolated.

The output stage switch mode controller may also be powered from the second boost voltage output line 254. This may allow the output stage power converter 204 to be started without the use of a separately controlled power supply to apply initial power to both the PFC controller 232 and the output stage switch mode controller.

Figure 7:
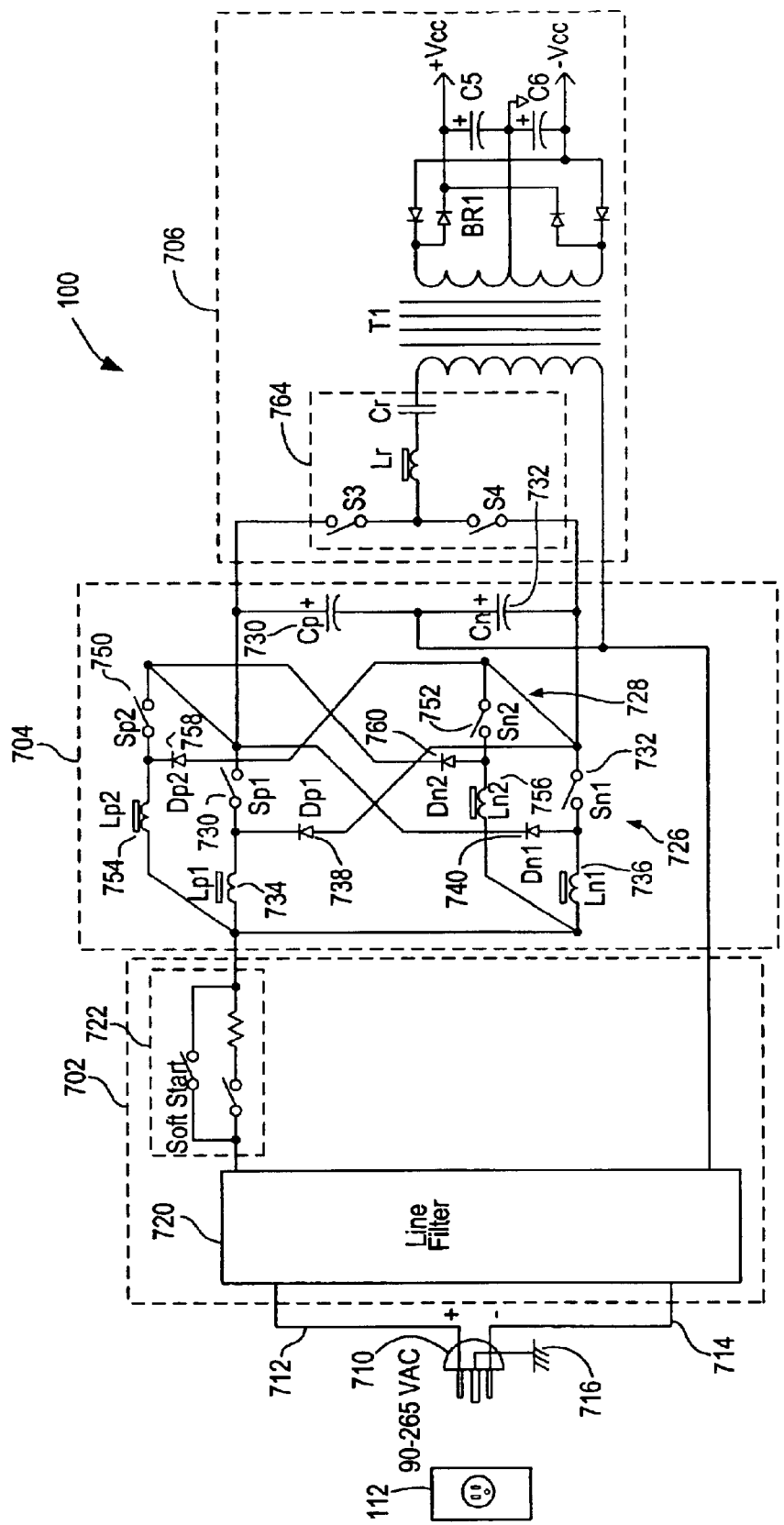
FIG. 7 is another schematic of the power factor correcting power supply illustrated in FIG. 1.

FIG. 7 illustrates another example of the power factor correcting power supply 100. Similar to FIG. 2, the power factor correcting power supply 100 may include a pre-stage 702. In addition, the power factor correcting power supply 100 includes an input stage power converter 704 and an output stage power converter 706. The power source 112 may supply single phase power in the range of about 90VAC to about 265VAC to the power factor correcting power supply 100 via a power plug 710 that includes a feeder line 712, a common line 714 and a ground 716. In other examples, other voltage ranges, numbers of phases and interconnections to the power source 112 are possible.

Like FIG. 2, the pre-stage 702 may or may not include a line filter 720 and a softstart circuit 722. The input stage power converter 704 may operate as a boost converter using a first opposed current converter 726 and a second opposed current converter 728 that are electrically coupled in parallel. Each of the first and second opposed current converters 726 and 728 are a half bridge configuration that operates like the opposed current converter 230 described with reference to FIG. 2.

The first opposed current converter 726 includes first and second boost switches (Sp1, Sn1) 730 and 732, first and second boost inductors (Lp1, Ln1) 734 and 736 and first second boost diodes (Dp1, Dn1) 738 and 740. The second opposed current converter 728 includes first and second boost switches (Sp2, Sn2) 750 and 752, first and second boost inductors (Lp2, Ln2) 754 and 756 and first second boost diodes (Dp2, Dn2) 758 and 760. In this example, however, a first boost capacitor (Cp) 730 and a second boost capacitor (Cn) 732 are common to each of the opposed current converters 726 and 728. Accordingly, the boost voltage (Vboost) such as about 380VDC to 400VDC is across each of the first and second boost capacitors (Cp, Cn) 730 and 732.

The first and second opposed current converters 726 and 728 are operated in parallel with interleaving to obtain further reductions in ripple current and increase in ripple frequency. Using four boost switches (Sp1, Sn1, Sp2, Sn2) 730, 732, 750 and 752 an interleave number of four (N=4) may be obtained. The interleave number of four may provide four modulation vectors separated by about ninety degrees.

Accordingly, ripple current is cancelled to the fourth order, the amplitude of the remaining ripple is reduced and the frequency of ripple is increased. Parallel operation also allows each of the opposed current converters 726 and 728 to carry about half the current of the single opposed current converter 230 discussed with reference to FIG. 2.

The opposed current converters 726 and 728 are controlled with a PFC controller (not shown) similar to those previously discussed with reference to FIGS. 2, 4, 5 and 6. The PFC controller may provide two separate PWM modulator triangle waveforms to separately control the boost switches (Sp1, Sn1, Sp2, Sn2) 730, 732, 750 and 752 of each of the opposed current converters 726 and 728. Each of the triangle waveforms can produce a modulator referenced to angles that are separated by about 180 degrees. The two triangle waveforms are maintained in phase quadrature by the PFC controller to maintain interleave of four operation. The opposed current converters 726 and 728 may also be operated with FM to improve EMI as in the example of FIG. 2.

Figure 8:
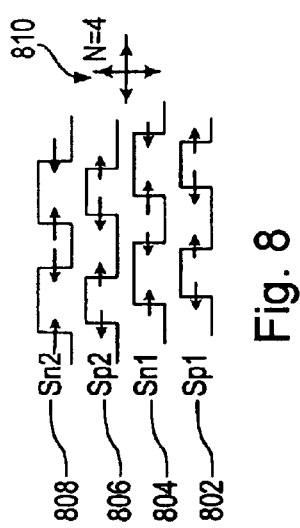
FIG. 8 is a timing diagram of an input stage power converter included in the power factor correcting power supply of FIG. 7.

FIG. 8 is a timing diagram illustrating operation of the first and second boost switches (Sp1, Sp2 and Sn1, Sn2) 730, 750 and 732, 752. A first modulation waveform 802 and a second modulation waveform 804 represent operation of the first and second boost switches (Sp1, Sn1) 730 and 732 of the first opposed current converter 726. A third modulation waveform 806 and a fourth modulation waveform 808 represent operation of the first and second boost switches (Sp2, Sn2) 750 and 752 of the second opposed current converter 728.

Each of the first and second modulation waveforms 802 and 804 and the third and fourth modulation waveforms 806 and 808 are PWM signals. The first and second modulation waveforms 802 and 804 share a substantially common time for the center of their pulses and modulate symmetrically such that the sum of their duty cycles is a constant of approximately unity. The sum of the duty cycles of the third and fourth modulation waveforms 806 and 808 is similarly a constant of approximately unity. In the example modulation waveforms illustrated, the input voltage (Vin) from the power source 112 would be somewhat negative and transitioning toward more positive voltage to have the duty and duty trends shown by the arrows on the first, second, third and fourth modulation waveforms 802, 804, 806 and 808. Also illustrated is a modulation phasing diagram 810 that includes four modulation vectors evenly separated by about 90 degrees. As in FIG. 3, each of the modulation vectors represent a modulation waveform 802, 804, 806 and 808 operating in interleave of four (N=4).

In FIG. 7, the output stage power converter 706 may be a circuit or device(s) capable of providing voltage conversion of the boost voltage (Vboost) provided by the input stage power converter 704 and galvanic isolation of the DC output voltage provided by the output stage power converter 706. The example output stage power converter 706 is a DC-to-DC power converter that includes a half bridge series resonant switch mode converter 764 operating at a fixed frequency. The output stage power converter 706 is similar in form and function to the output stage power converter 204 discussed with reference to FIG. 2. In other examples, a full bridge series resonant switch mode converter, or any other switch mode converter configuration providing similar functionality may be utilized.

Figure 9:
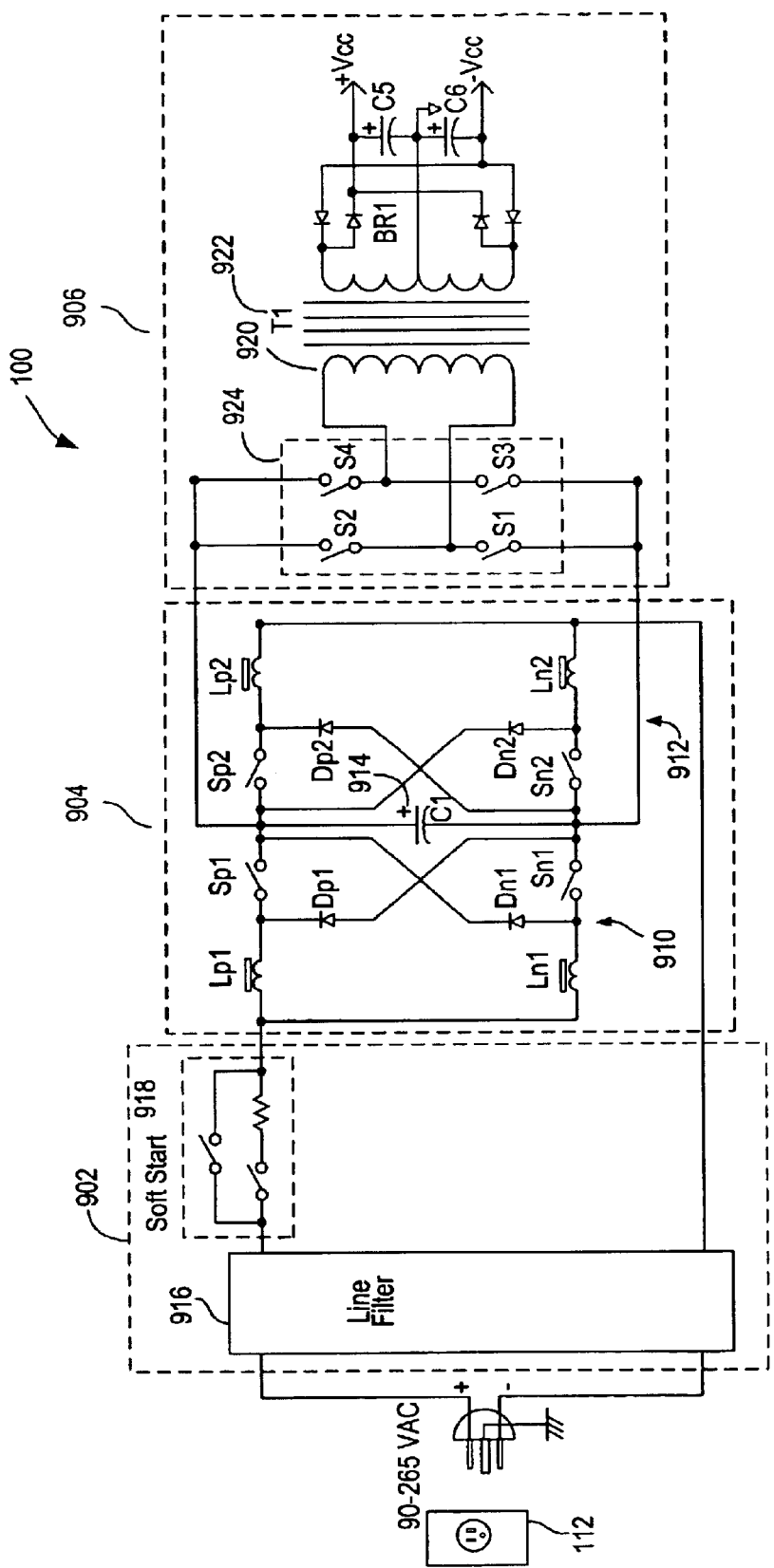
FIG. 9 is another schematic of the power factor correcting power supply illustrated in FIG. 1.

FIG. 9 is another example of a power factor correcting power supply 100 similar to the example of FIG. 7 that may include a pre-stage 902. In addition, the power factor correcting power supply 100 includes an input stage power converter 904 and an output stage power converter 906. For purposes of brevity, only differences with FIG. 7 will be discussed in detail. In the example of FIG. 9, the input stage power converter 902 includes a first opposed current converter 910 and a second opposed current converter 912. The first and second opposed current converters 910 and 912 may each be half bridge stages that are electrically coupled to form a full bridge converter. Such a configuration is described in the '219 patent. Similar to FIG. 7, the first opposed current converter 910 and the second opposed current converter 912 can be interleaved with an interleave of four (N=4) to minimize ripple current. Interleave of four also results in ripple frequency four times higher than the switching frequency.

In the full bridge configuration, the first and second opposed current converters 910 and 912 share a single full bridge boost capacitor (C1) 914. In this configuration, the full bridge boost capacitor (C1) 914 experiences only peak voltage, not peak-to-peak voltage. Accordingly, the full bridge configuration results in less total voltage being required on the full bridge boost capacitor (C1) 914 (e.g. lower output voltage (Vboost)) when compared to the configuration of FIG. 7. In FIG. 7, the boost voltage (Vboost) was across each of two boost capacitors electrically coupled in series. Thus the peak-to-peak voltage is twice the boost voltage (Vboost).

In the configuration illustrated in FIG. 9, the full bridge boost capacitor (C1) 914 may be charged to a boost voltage (Vboost) such as between about 380VDC and 400VDC with an input voltage (Vin) from the power source 112 such as between about 90VAC and about 265VAC. The switching frequency of the boost switches (Sp1, Sp2 and Sn1, Sn2) included in the first and second opposed current converters 910 and 912 may also be increased due to the lower voltage. In addition, the opposed current converters 910 and 912 may be operated with FM as previously discussed. As a result, a smaller line filter 916 may be utilized. In addition, the boost inductors (Lp1, Ln1, Lp2, Ln2) may be smaller due to the higher effective switching frequency and lower voltages.

Since the output stage power converter 906 is electrically coupled across the full bridge boost capacitor (C1) 914, the lower boost voltage (Vboost) is provided to the output stage power converter 906. With the lower boost voltage (Vboost), however, the current on the output stage power converter 906 may be doubled. To alleviate the doubling of the current, the voltage provided to a primary winding 920 of a galvanically isolated transformer (T1) 922 included in the output stage power converter 906 may be doubled. The boost voltage (Vboost) may be doubled using a non-resonant full bridge switch mode converter 924 also included in the output stage power converter 906 as illustrated. Use of the full bridge switch mode converter 924 may be a practical approach for a load such as a multi-kilowatt output stage power amplifier 906. Alternatively, the full bridge switch mode converter 924 may be a series resonant form or any other form of switch mode converter providing similar functionality.

Figure 10:
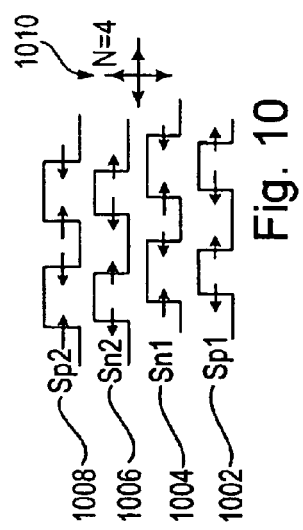
FIG. 10 is a timing diagram of an input stage power converter included in the power factor correcting power supply of FIG. 9.

FIG. 10 is a timing diagram illustrating operation of the boost switches (Sp1, Sn1 and Sp2, Sn2) within the respective first and second opposed current converters 910 and 912 (FIG. 9). A first modulation waveform 1002 and a second modulation waveform 1004 represent operation of the respective boost switches (Sp1, Sn1) of the first opposed current converter 910. A third modulation waveform 1008 and a fourth modulation waveform 1006 represent operation of the respective boost switches (Sp2, Sn2) of the second opposed current converter 728.

Similar to FIG. 8, each of the first and second modulation waveforms 1002 and 1004 and the third and fourth modulation waveforms 1006 and 1008 are PWM signals. In addition, the cooperatively operating modulation waveforms share a substantially common time for the center of their pulses and modulate symmetrically such that the sum of their duty cycles is a constant of approximately unity. As in the previously discussed timing diagrams, the input voltage (Vin) would be negative and transitioning to a more positive voltage for the timing as shown In the timing diagram of FIG. 10, however, the opposed current converters 910 and 912 (FIG. 9) (two half bridges) of the full bridge are modulated anti-phase to double the effective input voltage (Vin) from the power source 112. Note that the switch duty of the boost switch Sn1 is equal to the switch duty of boost switch Sp2 and the switch duty of boost switch Sp1 is equal to the switch duty of the boost switch Sn2. The PWM voltage (Vc) of each of the first and second half bridges 910 and 912 is additive to double the PWM voltage (Vc). Also illustrated is a modulation phasing diagram 1010 that includes four modulation vectors evenly spaced at about 90 degrees.

Figure 11:
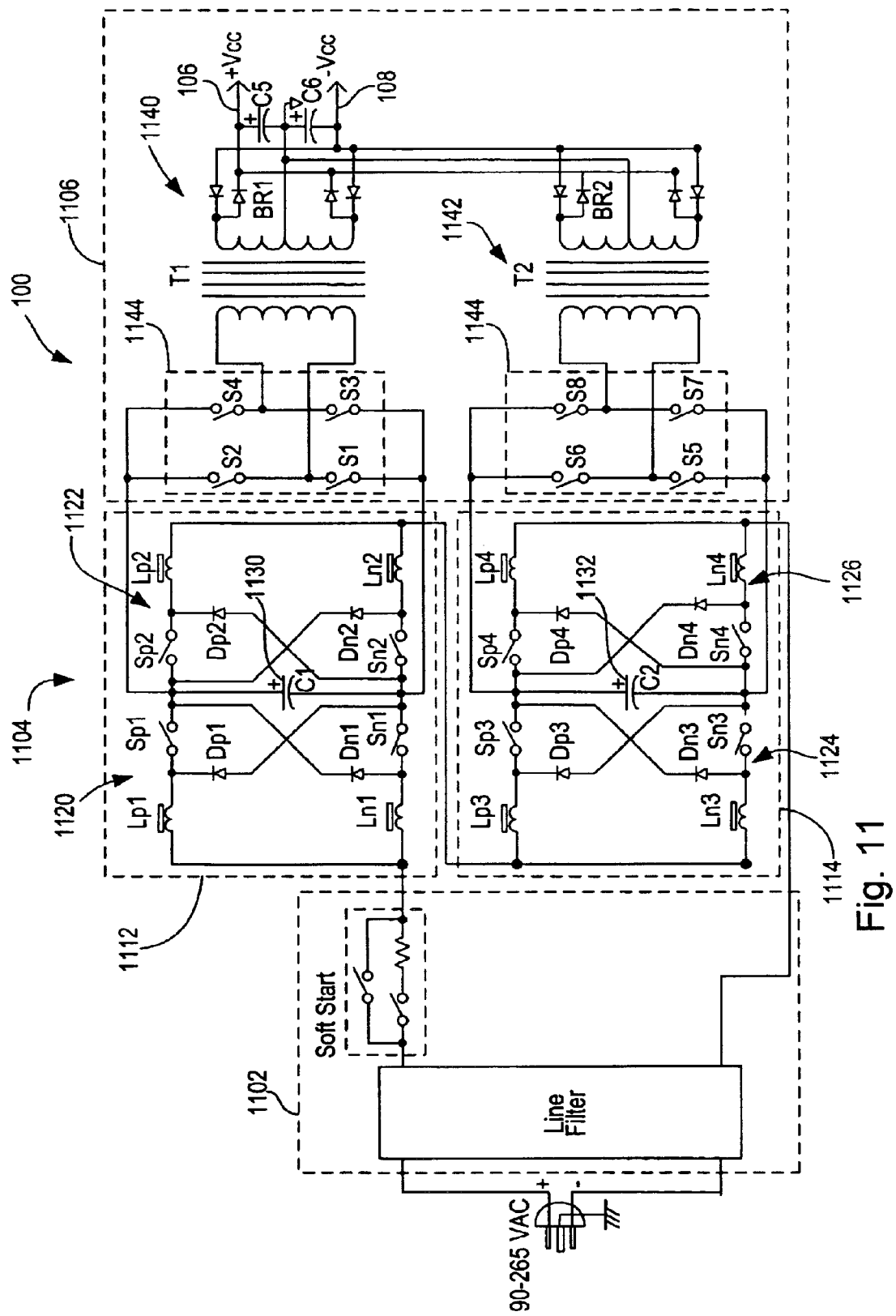
FIG. 11 is yet another schematic of the power factor correcting power supply illustrated in FIG. 1.

FIG. 11 is yet another example power factor correcting power supply 100 that may include a pre-stage 1102. In addition, the power factor correcting power supply 100 includes an input stage power converter 1104 and an output stage power converter 1106. In this example, the input stage power converter 1104 includes a first full bridge 1112 and a second full bridge 1114 electrically coupled in series. The first full bridge 1112 includes a first opposed current converter 1120 and a second opposed current converter 1122 that are each half bridges. The second full bridge 1114 includes a third opposed current converter 1124 and a fourth opposed current converter 1126 that are each half bridges. Similar to FIG. 9, the first full bridge 1112 also includes a first full bridge boost capacitor ($C_1$) 1130 that is shared by the first and second opposed current converters 1120 and 1122, and the second full bridge 1114 includes a second full bridge boost capacitor ($C_2$) 1132 shared by the third and fourth opposed current converters 1124 and 1126. The opposed current converters 1120, 1122, 1124 and 1126 can be operated with FM to improve EMI as previously discussed.

The power factor correcting power supply 100 of FIG. 11 operates with an interleave number of eight (N=8). Since the first and second full bridges 1112 and 1114 are in series, each of the first and second full bridges 1112 and 1114 provide only half of the total boost voltage (Vboost). For example, where the desired total boost voltage (Vboost) is about 380VDC, each of the first and second full bridges 1112 and 1114 may operate with about 190VDC of operating voltage on the first and second full bridge boost capacitors ($C_1$, $C_2$) 1130 and 1132, respectively. Accordingly, the PWM voltage (Vc) may also be reduced by a factor of four.

Due to the interleave number of eight, the input ripple current amplitude is reduced by a factor of 64 compared to a non-interleaved boost converter PFC. In addition, the ripple frequency is increased eight fold. Further, modulation vectors are spaced at about 45 degree intervals around the four quadrants. In practice, the lower operating voltage allows for higher switching frequency of the opposed current converters 1120, 1122, 1124 and 1126. The higher switching frequency allows the net inductor volume to be reduced well below that required in a non-interleaved PFC boost converter.

Figure 12:
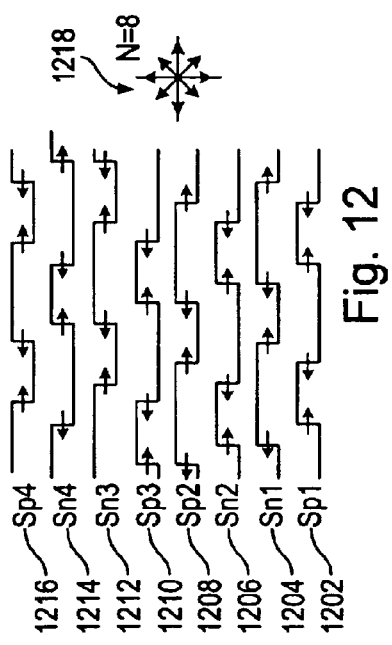
FIG. 12 is a timing diagram of an input stage power converter included in the power factor correcting power supply of FIG. 11.

FIG. 12 is a timing diagram for the power factor correcting power supply 100 illustrated in FIG. 11. The timing waveforms are PWM waveforms driving each of the boost switches (Sp1, Sn1; Sp2, Sn2; Sp3, Sn3 and Sp4, Sn4) within the respective opposed current converters 1120, 1122, 1124 and 1126 (FIG. 11). First and second modulation waveforms 1202 and 1204 represent operation of the respective boost switches (Sp1, Sn1) of the first opposed current converter 1120. Third and fourth modulation waveforms 1206 and 1208 represent operation of the respective boost switches (Sn2, Sp2) of the second opposed current converter 1122. Fifth and sixth modulation waveforms 1210 and 1212 represent operation of the respective boost switches (Sp3, Sn3) of the third opposed current converter 1124. Seventh and eighth modulation waveforms 1214 and 1216 represent operation of the respective boost switches (Sn4, Sp4) of the fourth opposed current converter 1126.

The timing waveforms represent an appreciable negative input voltage (Vin) that is going more negative as indicated by the arrows on the waveforms. The boost switch pairs (Sp1, Sn1; Sp2, Sn2; Sp3, Sn3 and Sp4, Sn4) of each respective opposed current converters 1120, 1122, 1124 and 1126 have sums of duty cycle equal to approximately unity as previously discussed. Also illustrated is a modulation phasing diagram 1218 that includes eight modulation vectors (N=8) representing each of the modulation waveforms 1202, 1204, 1206, 1208, 1210, 1212, 1214 and 1216. The modulation vectors are evenly spaced about 45 degrees apart around the modulation phasing diagram 1218.

In FIG. 11, the output stage power converter 1106 includes a first $2^{nd}$ stage converter 1140 and a second $2^{nd}$ stage converter 1142. The example first and second $2^{nd}$ stage converters 1140 and 1142 each include full bridge non-resonant switch mode converter 1144 (choppers). In other examples, the first and second $2^{nd}$ stage converters 1140 and 1142 may each include series resonant or any other switch mode converter configuration with similar functionality. The first and second $2^{nd}$ stage converters 1140 and 1142 may operate with a master controller (not shown). The master controller may operate the first and second $2^{nd}$ stage converters 1140 and 1142 with fixed frequency and interleave. Interleave doubles the ripple frequency on the positive DC rail 106 and the negative DC rail 108. In addition, the ripple currents in the capacitors (C5, C6) of the $2^{nd}$ stage power converters 1140 and 1142 are reduced.

The series configuration of the first and second full bridges 1112 and 1114 also provides self-stabilization. When the voltage across the first full bridge boost capacitor ($C_1$) 1130 and the second full bridge boost capacitor ($C_2$) 1132 are substantially in equilibrium, substantially the same discharging current flows through each of the first $2^{nd}$ stage converter 1140 and the second $2^{nd}$ stage converter 1142. By virtue of being connected in the same current path, the first and second full bridges 1112 and 1114 process substantially similar current. When the voltages are not substantially equal, the full bridge $2^{nd}$ stage converter 1140 or 1142 with the greater stored voltage on the first or second full bridge boost capacitor 1130 or 1132 will discharge the respective stored voltage until the voltages reach equilibrium and the $2^{nd}$ stage converters 1140 and 1142 share power and therefore share current. Both the $2^{nd}$ stage converters 1140 and 1142 supply DC output voltage to the same positive DC rail 106 and negative DC rail 108. As such, the $2^{nd}$ stage converters 1140 and 1142 also share power by operating at substantially identical voltages.

Figure 13:
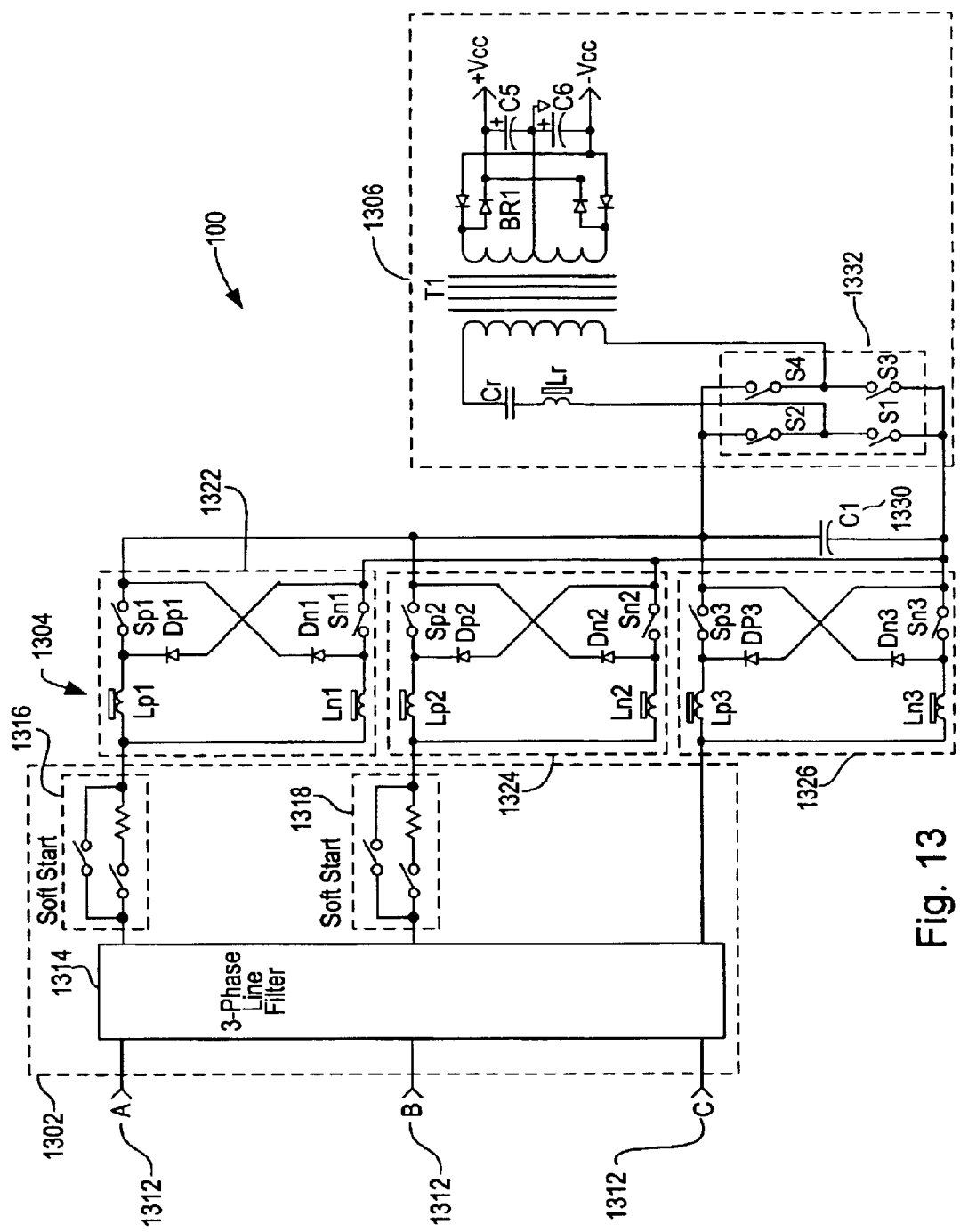
FIG. 13 is still another schematic of the power factor correcting power supply illustrated in FIG. 1.

FIG. 13 is still another example of a power factor correcting power supply 100 that provides three phase power factor correction (PFC). The power factor correcting power supply 100 may include a pre-stage 1302. In addition, the power factor correcting power supply 100 includes an input stage power converter 1304 and an output stage power converter 1306. A three phase power source 1312 provides three phase AC input voltage (Vin) and input current (Iin) to the power factor correcting power supply 100. The illustrated power factor correcting power supply 100 is otherwise functionally similar to the single phase example discussed with reference to FIG. 2. The pre-stage 1302 includes a three-phase line filter 1314 to filter EMI as well as a first soft start circuit 1316 and a second soft start circuit 1318 to manage inrush and fault currents as previously discussed.

The input stage power converter 1304 includes a first opposed current converter 1322, a second opposed current converter 1324 and a third opposed current converter 1326 respectively operating on each of the three phases. The opposed current converters 1322, 1324 and 1326 share a common three phase boost capacitor (C1) 1330 as a common boost voltage (Vboost) that also embeds a "pseudo neutral." at mid capacitor voltage. The opposed current converters 1322, 1324 and 1326 are controlled by a PFC controller as previously discussed. The PFC controller (not shown) may generate three separate PWM modulating triangle waveforms to control the boost switches of the respective opposed current converters 1322, 1324 and 1326.

The modulation provided by the PFC controller to the individual opposed current converters 1322, 1324 and 1326 can contain triplens. The triplens result in a third harmonic that may be added to the pseudo neutral point. The third harmonic allows reduction in the peak voltage supplied to the opposed current converters 1322, 1324 and 1326 by as much as about 13% over the dynamic range of the input voltage (Vin) provided by the power source 1302. As such, the boost voltage (Vboost) may be less than the desired output voltage since the difference will be made up by the addition of the triplens.

For example, where the boost voltage (Vboost) is desired to be about 380VDC to 400VDC, the output voltage may be under 340VDC to 360VDC for a 208VAC (delta) input voltage (Vin) provided by the power source 1312. Without the addition of the triplens, the boost voltage (Vboost) for 208VAC input voltage (Vin) would need a desired voltage of about 380VDC to 400VDC. In this regard, the input stage power converter 1304 of FIG. 13 has more in common with the full-bridge design example discussed with reference to FIG. 9, than with the single phase design example discussed with reference to FIG. 2.

The best phasing for the phase-to-phase interleave of the opposed current converters 1322, 1324 and 1326 may be varied. Each phase can be interleave of two, however optimization of the ripple currents for the three phases is no longer as simple as in the previously discussed single phase examples. An interleave of six is desirable for the example input stage power converter 1304. With an interleave of six, however, due to the three phases, ripple current may still be present in each phase at frequencies below six times the switching frequency of the opposed current converters 1322, 1324 and 1326. Incomplete cancellation of the ripple may now occur at two times and four times the switching frequency. The EMI filtering of the three phase line filter 1314 may be appropriately sized to minimize such ripple. It should also be noted that the interleave of two within the opposed current converter 1322, 1324 and 1326 of each phase may not cancel the ripple at all the odd multiples of the switching frequency.

Figure 14:
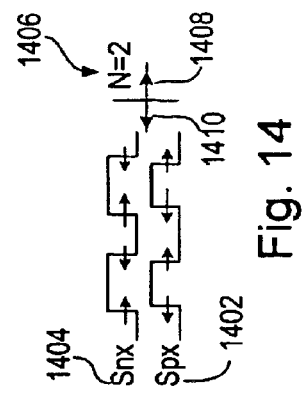
FIG. 14 is a timing diagram of an input stage power converter included in the power factor correcting power supply of FIG. 13.

FIG. 14 is a timing diagram illustrating operation of the first and second boost switches (Spx, Snx) for each of the opposed current converters 1322, 1324 and 1326 operating independently with an interleave of two. The "x" may be either a 1, 2 or 3 depending on the opposed current converter being considered. Similar to FIG. 3, a first modulation waveform 1402 representing operation of the first boost switch (Spx) and a second modulation waveform 1404 representing operation of the second boost switch (Snx) are illustrated. The first and second modulation waveforms 1402 and 1404 are PWM signals sharing a substantially common time for the center of their pulses. The PWM signals are modulated symmetrically such that the sum of their duty cycles is a constant of approximately unity. In the example modulation waveforms illustrated, the input voltage (Vin) from the power source 312 would be somewhat negative and going positive to have the duty and duty trends shown by the arrows on the first and second modulation waveforms 1402 and 1404.

Also illustrated in FIG. 14 is a modulation phasing diagram 1406 illustrating the phasing of a first vector 1408 representing modulation of the first modulation waveform 1402 with respect to a second vector 1410 representing modulation of the second modulation waveform 1404. As illustrated, the vectors are spaced apart by about 180 degrees. The example output stage power converter 1306 illustrated in FIG. 13 includes a full-bridge series resonant switch mode converter 1334 to reduce the switch currents as previously discussed. In other examples, other DC to DC switch mode converters, such as a chopper, half bridge, etc., may be used.

Figure 15:
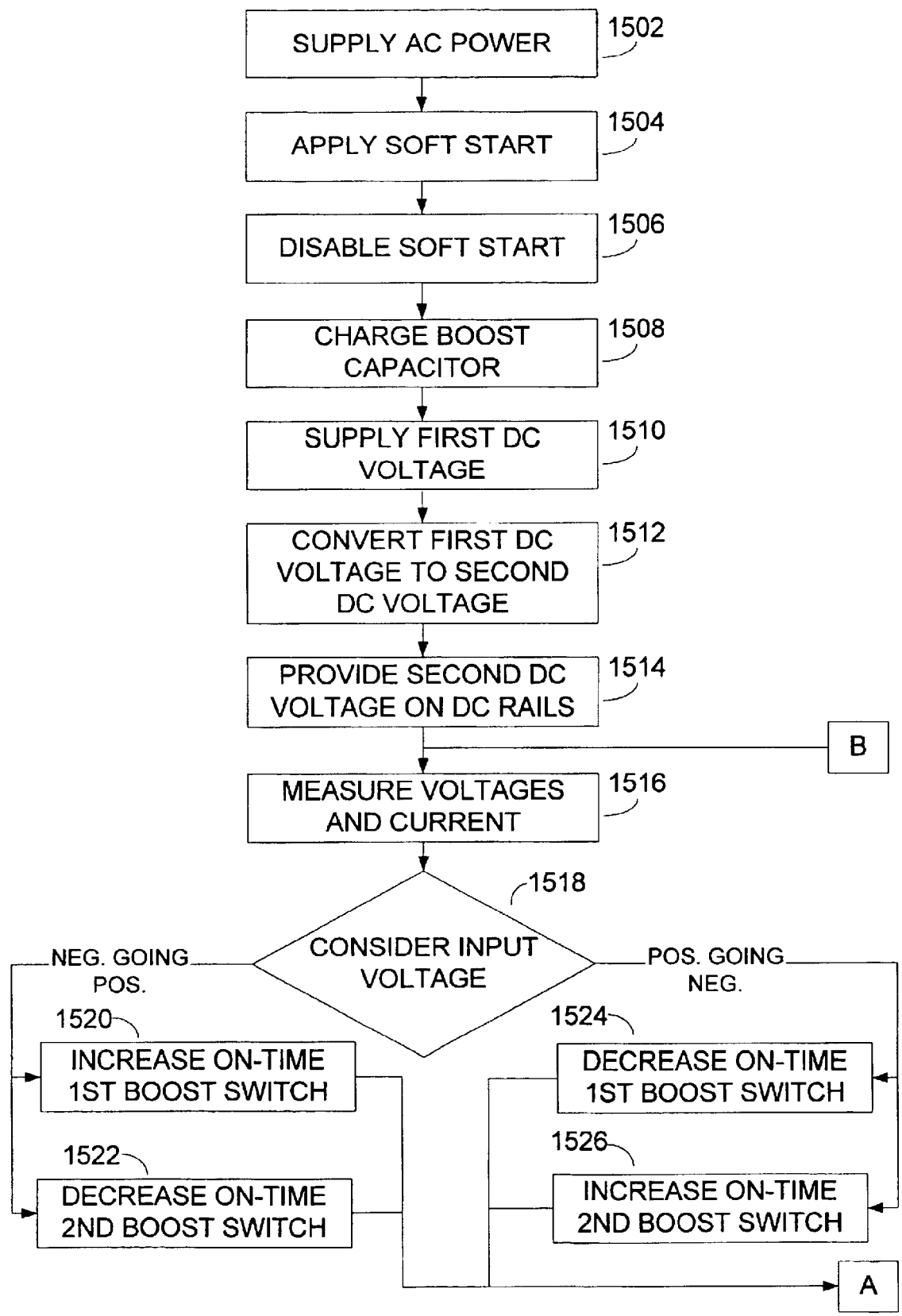
FIG. 15 is a portion of a process flow diagram illustrating the operation of a power factor correcting power supply of FIG. 1.

FIG. 15 is a process flow diagram illustrating example operation of the previously discussed examples of the power factor correcting power supply 100 discussed with reference to FIGS. 1–14. The operation begins at block 1502 when AC power in the form of AC input voltage (Vin) and AC input current (Iin) is supplied to the power factor correcting power supply 100 from a power source. One or more softstart circuits are activated at block 1504 to enable soft start by switching in a resistor(s) to limit inrush current. At block 1506, the boost capacitors of the input stage power converter and the capacitors of the output stage power converter have been initially charged and the soft-start circuit(s) disable soft start by switching out the resistor(s).

The PFC controller controls switching of the boost switches in the opposed current converter(s) to convert the AC voltage to a first DC voltage at block 1508. The AC voltage is converted by charging at least one boost capacitor to the boost voltage (Vboost) that is the first DC voltage. The boost capacitor is charged with the PWM voltage (Vc) and the peak charging current (Ic) provided by the opposed current converter. At block 1510, the first DC voltage is supplied to the output stage power converter. The output stage power converter converts the first DC voltage to a second DC voltage at block 1512. At block 1514, the second DC voltage is provided on the positive and negative DC rails as DC output voltage (+Vcc, −Vcc) of the power factor correcting power supply.

The PFC controller senses the measured voltages and currents at block 1516. As previously discussed, the measured voltages and currents include the input voltage (Vin) from the power source, the input current (Iin) from the power source and the DC output voltage on the positive and negative DC rails. In addition, the boost voltage (Vboost) from the opposed current converter(s) may be sensed. At block 1518, the PFC controller considers the input voltage (Vin) from the power source for purposes of accommodating the range of possible input voltages (Vin) provided from the power source.

If the input voltage (Vin) is somewhat negative and going positive, the PFC controller increases the on-time portion of the duty cycle of the first boost switch(s) (Sp) at block 1520, and also decreases the on-time portion of the duty cycle of the second boost switch(s) (Sn) at block 1522 while maintaining a substantially common center of time of the respective duty cycles. The first and second boost switches (Sp, Sn) are therefore closed concurrently during a portion of each duty cycle. If at block 1518, the input voltage (Vin) is somewhat positive and going negative, the PFC controller decreases the on-time portion of the duty cycle of the first boost switch(s) (Sp) at block 1526, and also increases the on-time portion of the duty cycle of the second boost switch(s) (Sn) at block 1528 while maintaining a substantially common center of time of the respective duty cycles.

Figure 16:
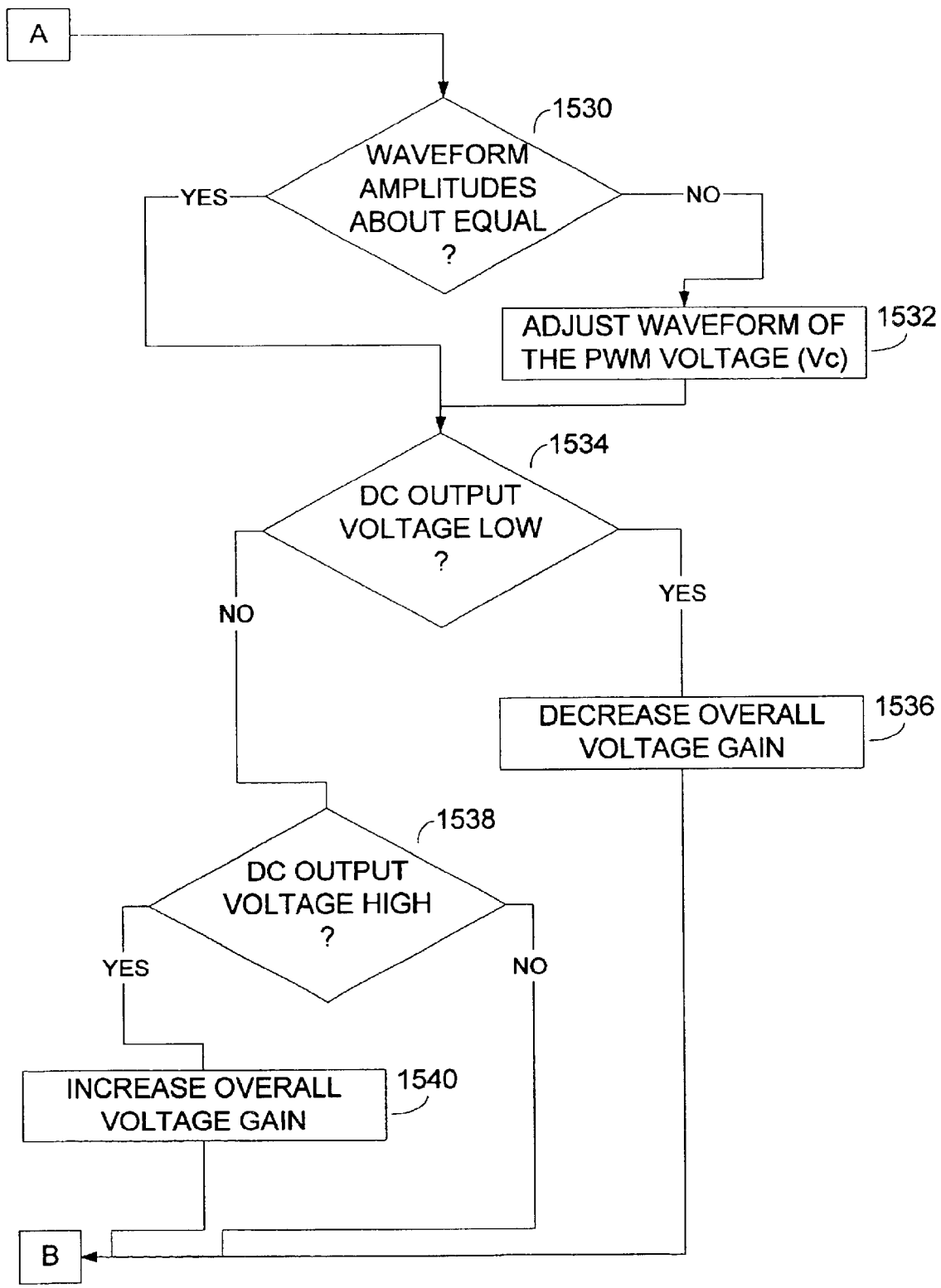
FIG. 16 is a second portion of the process flow diagram illustrating the operation of the power factor correcting power supply of FIG. 1.

In FIG. 16 at block 1530, the PFC controller considers whether the average amplitude of the waveform of the PWM voltage (Vc) produced by the opposed current converter is greater or less than the amplitude of the waveform of the input voltage (Vin). If the waveforms are not equal, the PFC controller adjusts the waveform of the PWM voltage (Vc) with the PWM modulator to bring the voltages into equilibrium at block 1532.

At block 1534, the PFC controller determines if the magnitude of DC output voltage (+Vcc, −Vcc) of the power factor correcting power supply is low. As previously discussed, the boost voltage (Vboost) may also be measured to determine low DC output voltage. If the DC output voltage is low, the overall voltage gain is reduced at block 1536. The overall voltage gain of the PFC controller is reduced to lower the amplitude of the PWM voltage (Vc) and thereby increase the peak charging current (Ic) such that more power is supplied from the power source by the power factor correcting power supply to the DC rails. As a result of the increased peak charging current, the magnitude of the boost voltage (Vboost) also rises. The operation then returns to block 1516 of FIG. 15 to continue controlling the power factor and regulating the DC output voltage.

Returning to block 1530, if the waveform of the PWM voltage (Vc) is substantially in equilibrium with the waveform of the input voltage (Vin) the operation proceeds to block 1534. If at block 1534, the DC output voltage is not low, the PFC controller determines if the DC output voltage (and the boost voltage (Vboost)) is high at block 1538. If yes, the overall voltage gain is increased at block 1540. The peak charging current is thereby reduced and the magnitude of the boost voltage (Vboost) and the DC output voltage is lowered. The operation then returns to block 1516 of FIG. 15. If the DC output voltage (and/or the boost voltage (Vboost)) is not high at block 1538 of FIG. 16, the operation similarly returns to block 1516 of FIG. 15 to continue controlling.

The previously discussed examples of the power factor correcting power supply utilize an AC power source to supply a DC load. The power factor correcting power supply includes at least one opposed current converter to perform DC voltage regulation and power factor correction. Through the use of interleave, the opposed current converter(s) also operates to reduce ripple current and therefore further improve power factor. Due to the use of the opposed current converter(s), the power factor correcting power supply operates without a bridge rectifier, thereby eliminating an initial stage. Elimination of the initial stage reduces losses by having only an input stage that includes the opposed current converter followed by an output stage that produces a desired regulated DC output voltage for a load.

The opposed current converter(s) is controlled with a PFC controller to operate as a boost converter and provide a boost voltage (Vboost) that is a DC voltage. The PFC controller controls the opposed current converter(s) to perform both voltage regulation and power factor correction by adjusting the duty cycle of boost switches included in the opposed current converter. Power factor correction is based on maintaining the average value of the waveform of the PWM voltage substantially similar to the value of the waveform of the AC input voltage (Vin).

Feedforward voltage regulation control may also be performed by the PFC controller based on the measured input voltage (Vin) to the opposed current converter. Feedback control based on the DC output voltage (positive DC output voltage (+Vcc) and negative DC output voltage (−Vcc)) of the power factor correcting power supply may also be used for voltage regulation. In addition, an additional feedforward control may utilize the measured boost voltage (Vboost) of the opposed current converter for voltage regulation. The feedback control may also utilize the measured current flow through the opposed current converter to further improve voltage regulation.

While various embodiments of the invention have been described, it will be apparent to those of ordinary skill in the art that many more embodiments and implementations are possible that are within the scope of the invention. Accordingly, the invention is not to be restricted except in light of the attached claims and their equivalents.

What is claimed is:

1. A power factor correcting power supply comprising:
    an opposed current converter having an input and an output;
    a power factor correction controller coupled with the opposed current converter, where the opposed current converter is directed by the power factor correction controller to control the waveshape of an AC line current supplyable to the input by a power source; and
    an output stage power converter coupled with the output of the opposed current converter, where the output stage power converter is configured to provide isolation and voltage conversion of a DC boost voltage provided at the output of the opposed current converter.

2. The power factor correcting power supply of claim 1, where the opposed current converter is configured as a boost converter to receive un-rectified AC voltage on the input and supply DC boost voltage on the output.

3. The power factor correcting power supply of claim 1, where the power factor correction controller is configured to control the opposed current converter to regulate the DC boost voltage supplied at the output.

4. The power factor correcting power supply of claim 1, where the opposed current converter is directed by the power factor correction controller with frequency modulation to control electromagnetic interference.

5. The power factor correcting power supply of claim 1, where the opposed current converter includes a pair of boost switches each operable at a duty cycle and configured to be closeable at substantially the same center of time to control the waveshape of the AC line current.

6. The power factor correcting power supply of claim 1, where the opposed current converter includes a boost capacitor and a plurality of boost switches, the boost switches switchable by the power factor correction controller to charge the boost capacitor to the DC boost voltage.

7. The power factor correcting power supply of claim 1, where the output stage power converter includes a fixed frequency switch mode power converter and a transformer, the fixed frequency switch mode power converter configured to provide DC output voltage to a DC rail, and the transformer having galvanic isolation to minimize switching noise of the opposed current converter.

8. The power factor correcting power supply of claim 1, where the opposed current converter includes a first boost capacitor and a second boost capacitor coupled at a center point, where the centerpoint is configured to couple with a common of the power source, and each of the first and second boost capacitors are chargeable to the DC boost voltage.

9. A power factor correcting power supply comprising:
a power factor correction controller;
an opposed current converter coupled with the power factor correction controller, where the opposed current converter is configured to receive un-rectified AC input voltage and supply a DC boost voltage; and
an output stage power converter coupled with the opposed current converter and configured to receive the DC boost voltage and supply a DC output voltage,
where the power factor correction controller is configured with feedforward control to direct the opposed current converter as a function of the DC boost voltage.

10. The power factor correcting power supply of claim 9, where the opposed current converter comprises a half bridge converter that includes a first boost capacitor and a second boost capacitor coupled via a centerpoint, where the centerpoint is configured to couple with the common line of a power source.

11. The power factor correcting power supply of claim 9, where the opposed current converter includes a first boost switch and a second boost switch, the first and second boost switches are switchable with only one double edge natural pulse width modulated triangle wave that is scaleable by the power factor correction controller with the feedforward control.

12. The power factor correcting power supply of claim 9, where the opposed current converter is configured to operate with interleave, the opposed current converter directable by the power factor correction controller to operate with interleave to form a pulse width modulation voltage with an average waveform that is substantially identical to a sinusoidal waveform of the un-rectified AC input voltage.

13. The power factor correcting power supply of claim 9, where the opposed current converter comprises a plurality of opposed current converters coupled in parallel to supply the DC boost voltage.

14. The power factor correcting power supply of claim 9, where the opposed current converter comprises a plurality of opposed current converters coupled to form a full bridge converter.

15. The power factor correcting power supply of claim 14, where the full bridge converter is operable with an interleave of four.

16. The power factor correcting power supply of claim 9, where the opposed current converter comprises a plurality of opposed current converters coupled to form a plurality of full bridge converters, where the full bridge converters are coupled in series.

17. The power factor correcting power supply of claim 9, where the opposed current converter comprises a plurality of opposed current converters, each of the opposed current converters configured to couple with one phase of a three phase power source.

18. The power factor correcting power supply of claim 9, where the power factor correction controller is further configured to direct the opposed current converter as a function of at least one of the DC output voltage and a rectified AC input current.

19. A power factor correcting power supply comprising:
an opposed current converter configured to receive an AC input voltage and an AC input current and supply a DC boost voltage,
where the opposed current converter includes a first boost switch and a second boost switch having a duty cycle, the first and second boost switches closeable concurrently during the duty cycle; and
means for controlling power factor coupled with the opposed current converter, where the means for controlling power factor is configured to control the duty cycle of the first and second boost switches to adjust a waveform of the AC input current to improve power factor.

20. The power factor correcting power supply of claim 19, further comprising means for converting the DC boost voltage to a desired DC output voltage.

21. The power factor correcting power supply of claim 20, where the means for controlling power factor is configured to regulate the desired DC output voltage as a function of the DC boost voltage.

22. The power factor correcting power supply of claim 20, where the means for controlling power factor is configured to regulate the desired DC output voltage as a function of the DC boost voltage and the desired DC output voltage.

23. The power factor correcting power supply of claim 20, where the means for controlling power factor is configured to regulate the desired DC output voltage as a function of the DC boost voltage, the desired DC output voltage and the AC input current.

24. The power factor correcting power supply of claim 20, where the means for converting the DC boost voltage is configured to galvanically isolate the desired DC output voltage from the opposed current converter.

25. The power factor correcting power supply of claim 19, where the means for controlling power factor is configured with feed forward control to control the duty cycle as a function of the magnitude of the AC input voltage.

26. A power factor correcting power supply comprising:
an input stage power converter that includes an opposed current converter coupled with a power factor correction controller,
where the opposed current converter includes a boost capacitor, a boost inductor and a pair of boost switches operable at a duty cycle, the pair of boost switches configured to be closed concurrently during a portion of the duty cycle to magnetize the boost inductor,
the pair of boost switches configured to each be opened during a portion of the duty cycle to charge the boost capacitor to a first DC voltage,
where interleaved switching of the pair of boost switches is controllable by the power factor correction controller to regulate the first DC voltage and to control a waveform of an AC input current supplyable to the input stage power converter; and
an output stage power converter coupled with the input stage power converter, where the output stage power converter is configured to convert the first DC voltage to a second DC voltage that is isolated from the first DC voltage.

27. The power factor correcting power supply of claim 26, where the input stage power converter is configured to consume power from a power source and provide power to the power source as directed by the power factor correction controller.

28. The power factor correcting power supply of claim 26, where the pair of boost switches is controllable by the power factor correction controller to form a pulse width modulation voltage having a sinusoidal waveform with an average amplitude that is substantially similar to an amplitude of a waveform of an AC input voltage to improve power factor.

29. The power factor correcting power supply of claim 26, where the output stage power converter comprises a series resonant switch mode converter.

30. The power factor correcting power supply of claim 29, where the output stage power converter is configured to operate with fixed frequency in a discontinuous current mode.

31. The power factor correcting power supply of claim 26, where the output stage power converter comprises a full bridge switch mode converter.

32. The power factor correcting power supply of claim 26, where the output stage power converter comprises a half bridge switch mode converter.

33. The power factor correcting power supply of claim 26, further comprising a softstart circuit coupled with the input stage power converter, where the softstart circuit includes a plurality of switches and a resistor to selectively limit AC input current supplied to the input stage power converter.

34. The power factor correcting power supply of claim 26, further comprising a line filter coupled with the input stage power converter to minimize electromagnetic interference.

35. A power factor correcting power supply comprising:
a power factor correction controller; and
an opposed current converter coupled with the power factor correction controller,
where the opposed current converter includes an input and an output and a boost capacitor, the boost capacitor chargeable to a DC boost voltage,
the opposed current converter controllable by the power factor correction controller as a function of a DC boost voltage supplied at the output to regulate the magnitude of the DC boost voltage,
the opposed current converter also controllable by the power factor correction controller to control the waveshape of an AC input current supplyable to the input by a power source.

36. The power factor correcting power supply of claim 35, where the boost capacitor is a plurality of boost capacitors and each of the boost capacitors is chargeable to the DC boost voltage.

37. The power factor correcting power supply of claim 35, further comprising a current sensing device coupled with the power factor correction controller, the current sensing device configured to sense the AC input current, the power factor correction controller configured to regulate the DC boost voltage and control the waveshape of the AC input current as a function of the DC boost voltage and the AC input current sensed by the power factor correction controller.

38. The power factor correcting power supply of claim 35, where the opposed current converter includes a pair of boost switches, the pair of boost switches having a duty cycle controllable by the power factor correction controller to regulate the DC boost voltage and control the waveshape of the AC input current.

39. The power factor correcting power supply of claim 38, where the pair of boost switches are configured to be closed at the same time during some portion of each duty cycle.

40. The power factor correcting power supply of claim 38, where the duty cycle of the pair of boost switches is controllable by the power factor correction controller to be substantially unity.

41. The power factor correcting power supply of claim 39, where the power factor correction controller is configured to scale a modulation waveform to be proportional to the DC boost voltage, where the pair of boost switches are switchable by the power factor correction controller with the modulation waveform.

42. The power factor correcting power supply of claim 37, where the power factor correction controller is configured to control the DC boost voltage with an output voltage feedback control loop as a function of the AC input current sensed by the power factor correction controller.

43. The power factor correcting power supply of claim 35, where the power factor correction controller includes an input voltage feedforward control loop, an output voltage feedback control loop and a voltage controlled inner loop, where the DC boost voltage is supplied as a feedforward control signal to the voltage controlled inner loop.

44. The power factor correcting power supply of claim 35, where the output of the opposed current converter is configured to be coupled with an output stage power converter, the output stage power converter includes a switch mode converter and a transformer to provide isolation and voltage conversion of the DC boost voltage provided at the output of the opposed current converter.

45. A method of performing power factor correction with a power factor correcting power supply, the method comprising:
providing an AC power source having an AC input voltage and an AC input current;
converting the AC input voltage to a first DC voltage with an opposed current converter controlled by a power factor correction controller;
transforming the first DC voltage to a second DC voltage with an output stage power converter; and
supplying the second DC voltage to a power rail to supply a load.

46. The method of claim 45, where converting the AC input voltage to a first DC voltage comprises regulating the second DC voltage to a desired magnitude as a function of the first DC voltage.

47. The method of claim 45, where the opposed current converter includes a plurality of boost inductors and a plurality of boost capacitors and the act of converting the AC input voltage to the first DC voltage comprises:
magnetizing one of the boost inductors with the AC power source and a first boost capacitor; and
demagnetizing the one of the boost inductors to charge a second boost capacitor.

48. The method of claim 45, where converting the AC input voltage to the first DC voltage comprises switching a first boost switch and a second boost switch included in the opposed current converter to be closed at substantially the same center of time to sequentially magnetize and demagnetize a first boost inductor and a second boost inductor also included in the opposed current converter.

49. The method of claim 45, where converting the AC input voltage to the first DC voltage comprises creating a pulse width modulation voltage with the opposed current converter to charge a boost capacitor included in the opposed current converter to the first DC voltage.

50. The method of claim 49, where creating the pulse width modulation voltage comprises regulating the relative magnitude of the pulse width modulation voltage to be less than the relative magnitude of the AC input voltage to provide power to the power rail.

51. The method of claim 49, where creating the pulse width modulation voltage comprises adjusting an average amplitude of a sinusoidal waveform of the pulse width modulation voltage to be substantially similar to an amplitude of a waveform of the AC input voltage to improve power factor.

52. A method of performing power factor correction with a power factor correcting power supply, the method comprising:

providing an AC power source having an AC input voltage and an AC input current;

converting the AC input voltage to a DC voltage with an opposed current converter controlled by a power factor correction controller;

decreasing a magnitude of a pulse width modulation voltage created by the opposed current converter from the AC input voltage to increase the flow of AC input current into the opposed current converter; and increasing the magnitude of the pulse width modulation voltage to decrease the flow of AC input current into the opposed current converter.

53. The method of claim 52, where decreasing and increasing the magnitude of the pulse width modulation voltage comprises regulating the DC voltage with the power factor correction controller as a function of the DC voltage.

54. The method of claim 52, where decreasing and increasing the magnitude of the pulse width modulation voltage comprises tracking the AC input voltage with the pulse width modulation voltage during quiescence conditions.

55. The method of claim 52, where decreasing and increasing the magnitude of the pulse width modulation voltage comprises scaling a modulating triangle waveform to be proportional to the DC voltage with the power factor correction controller.

56. The method of claim 52, where decreasing and increasing the magnitude of the pulse width modulation voltage comprises performing feedforward control of the DC voltage with the DC voltage and performing feedback control of the DC voltage with the AC input current.

57. The method of claim 52, further comprising maintaining an average amplitude of the pulse width modulation voltage substantially the same as an amplitude of the AC input voltage.

58. The method of claim 52, where the opposed current converter includes a first boost switch and a second boost switch, and decreasing the magnitude of the pulse width modulation voltage comprises decreasing an on-time portion of a duty cycle of the first boost switch and increasing an on-time portion of a duty cycle of the second boost switch, where both the first and the second boost switches are closed concurrently during part of each duty cycle.

59. The method of claim 58, where increasing the magnitude of the pulse width modulation voltage comprises increasing the duty cycle of the first boost switch and decreasing the duty cycle of the second boost switch.

* * * * *